US008073561B2

(12) United States Patent
Hirose

(10) Patent No.: US 8,073,561 B2
(45) Date of Patent: Dec. 6, 2011

(54) SEWING MACHINE AND METHOD FOR MANAGING MANUFACTURE OF THE SAME

(75) Inventor: Hirokazu Hirose, Chiryu (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 1202 days.

(21) Appl. No.: 11/808,705

(22) Filed: Jun. 12, 2007

(65) Prior Publication Data

US 2007/0289514 A1 Dec. 20, 2007

(30) Foreign Application Priority Data

Jun. 15, 2006 (JP) ................................ 2006-165478

(51) Int. Cl.
*G06F 19/00* (2011.01)

(52) U.S. Cl. ........................................................ 700/136

(58) Field of Classification Search .................. 700/138, 700/139; 112/470.01, 470.03, 470.04
See application file for complete search history.

(56) References Cited

U.S. PATENT DOCUMENTS

| | | | | | |
|---|---|---|---|---|---|
| 4,616,583 | A | * | 10/1986 | Takano et al. | 112/470.04 |
| 4,784,073 | A | * | 11/1988 | Hanyu et al. | 112/453 |
| 4,982,674 | A | * | 1/1991 | Hayakawa | 112/102.5 |
| 5,029,538 | A | * | 7/1991 | Gaumann et al. | 112/470.01 |
| 5,270,939 | A | * | 12/1993 | Goldberg et al. | 700/138 |
| 5,648,908 | A | * | 7/1997 | Chirn et al. | 700/135 |
| 5,867,391 | A | * | 2/1999 | Muto | 700/137 |
| 5,953,226 | A | * | 9/1999 | Mellish et al. | 700/18 |
| 6,105,520 | A | * | 8/2000 | Frazer et al. | 112/117 |
| 6,173,665 | B1 | * | 1/2001 | Sekine | 112/102.5 |
| 6,205,060 | B1 | | 3/2001 | Sanda et al. | |
| 6,247,420 | B1 | * | 6/2001 | Chan et al. | 112/475.19 |
| 6,311,097 | B2 | * | 10/2001 | Kwak | 700/138 |
| 6,445,970 | B1 | * | 9/2002 | Hedman et al. | 700/138 |
| 6,640,153 | B2 | * | 10/2003 | Kwak | 700/138 |
| 6,681,707 | B2 | * | 1/2004 | Michioku et al. | 112/470.04 |
| 7,149,349 | B2 | * | 12/2006 | Druitt et al. | 382/165 |
| 2006/0170551 | A1 | | 8/2006 | Nakamura et al. | |
| 2007/0129840 | A1 | * | 6/2007 | Nobuyuki et al. | 700/138 |

FOREIGN PATENT DOCUMENTS

| | | |
|---|---|---|
| JP | A-02-286193 | 11/1990 |
| JP | A 11-104375 | 4/1999 |
| JP | A 2000-066340 | 3/2000 |
| JP | A 2000-185184 | 7/2000 |

(Continued)

OTHER PUBLICATIONS

Sep. 6, 2011 Office Action issued in Japanese patent application No. 2006-165478 with English translation).

*Primary Examiner* — Larry Worrell, Jr.
(74) *Attorney, Agent, or Firm* — Oliff & Berridge, PLC

(57) ABSTRACT

A sewing machine and a method for managing manufacture of the sewing machine that effectively utilize production information in a manufacture process or a repair process of the sewing machine. The sewing machine may include a stitch formation device that forms stitches in work cloth by relatively moving the work cloth with respect to a vertically moving needle; a display device that displays a record of performing an operational test, in which operations of the sewing machine are adjusted or confirmed, the operational test including test items; and a performance record storage device that stores the performance record, the performance record being correlated with the test items of the operational test.

17 Claims, 16 Drawing Sheets

FOREIGN PATENT DOCUMENTS

| | | |
|---|---|---|
| JP | A 2000-228341 | 8/2000 |
| JP | A-2002-248286 | 9/2002 |
| JP | A 2003-210876 | 7/2003 |
| JP | A-2004-016697 | 1/2004 |
| JP | A 2004-334365 | 11/2004 |
| JP | A 2005-063095 | 3/2005 |
| JP | A 2005-157705 | 6/2005 |

* cited by examiner

FIG. 7

| NO. | TEST ITEM | ACCEPTANCE CRITERION |
|---|---|---|
| 01 | LCD CONTRAST ADJUSTMENT | SCREEN MUST BE DISPLAYED |
| 02 | PIVOTING OPERATION CONFIRMATION | ANY OF OK BUTTONS DISPLAYED ON SCREEN MUST BE PRESSED |
| 03 | MAXIMUM ROTATIONAL SPEED CONFIRMATION | MAXIMUM ROTATIONAL SPEED MUST BE 950-1050RPM |
| 04 | DISSIPATION POWER CONFIRMATION | SCREEN MUST BE DISPLAYED TO START SEWING |
| 05 | TOUCH PANEL ADJUSTMENT CONFIRMATION | X-DIRECTIONAL SHIFT MUST BE 3 DOTS OR LESS AND Y-DIRECTIONAL SHIFT MUST BE 4 DOTS OR LESS |
| 06 | PARAMETER DEFAULT CONFIRMATION | PARAMETERS MUST ALL BE SET TO DEFAULT VALUES |

SEWING MACHINE AND METHOD FOR MANAGING MANUFACTURE OF THE SAME

CROSS-REFERENCE TO RELATED APPLICATION

This application claims priority from JP 2006-165478, filed Jun. 15, 2006, the entire disclosure of which is incorporated herein by reference thereto.

BACKGROUND

The related technical fields include a sewing machine and a method for managing manufacture of the sewing machine. More specifically, the related technical fields include a sewing machine that is equipped with a CPU so that sewing processing may be automatically performed and a method for managing manufacture of the sewing machine.

SUMMARY

In the related art, a sewing machine is equipped with a stitch formation device to form a stitch in a work cloth by relatively moving it with respect to a needle moving vertically and a multifunctional sewing machine that includes a built-in microcomputer or a computer that controls the sewing operations. These sewing machines are capable of performing a variety of pieces of processing, for example, selecting a sewing-target pattern by using a touch panel, etc., included on the sewing machine, or forming a desired stitch by inputting it through the computer.

As the sewing machine becomes multifunctional and to properly operate such a sewing machine having complicated functions, it has been desired to properly perform production management and quality control. With this, for example, a sewing machine is proposed that stores its own repair history information in a nonvolatile memory built within it (see, for example, Japanese Patent Application Laid Open Publication No. Hei 11-104375). The sewing machine has a storage device to store information, such as repair information, that is specific to the sewing machine. An operator can view the repair historical information of the sewing machine through its display. By confirming the specific information, it is possible to know the history of past repair work.

However, information obtained in an operational test, which is performed during a manufacture or repair process of a sewing machine to adjust or confirm its operations, has been typically managed using a paper check sheet. Accordingly, information on whether or not the operational test has been performed properly during the manufacture or repair process has not been stored in the sewing machine. It has thus been difficult to refer to a performance record obtained by performing the operational test during the manufacture or repair process after the operational test. Further, the record obtained during the operational test has never been fed back and utilized effectively in manufacture management, etc.

Exemplary embodiments provide a sewing machine and a method for managing manufacture of the same that can effectively utilize production information obtained during a process of manufacturing or repairing the sewing machine and, further, easily manage the production information for each of the sewing machines.

An exemplary embodiment includes a sewing machine that includes: a stitch formation device that forms stitches in work cloth by relatively moving the work cloth with respect to a vertically moving needle; a display device that displays a record of performing an operational test in which operations of the sewing machine are adjusted or confirmed; and a performance record storage device that stores the performance record, the performance record being correlated with test items of the operational test.

According to another exemplary embodiment, a sewing machine manufacture management method includes: performing the operational the operational test; and displaying at least one of status of performance of the test items of the operational test, i.e. whether or not the test items of the operational test have been performed, that is obtained by referring to the stored performance record and the status of results of each of the test items, i.e., whether or not the sewing machine has passed each of the test items, that is obtained by comparing the performance record and the predetermined acceptance criteria.

BRIEF DESCRIPTION OF THE DRAWINGS

Exemplary embodiments will be described in detail with reference to the accompanying drawings in which:

FIG. 7 is an explanatory table of acceptance criteria for each of the test items stored in a ROM;

DETAILED DESCRIPTION OF EXEMPLARY EMBODIMENTS

Exemplary embodiments of the broad principles described herein are described. An exemplary embodiment is a sewing machine that forms stitches in work cloth by relatively moving the work cloth with respect to a vertically moving needle. First, a physical configuration and an electrical configuration of a sewing machine 1 in accordance with this exemplary embodiment are described.

The physical configuration of the sewing machine 1 is described with reference to FIGS. 1 and 2.

Figure 1:
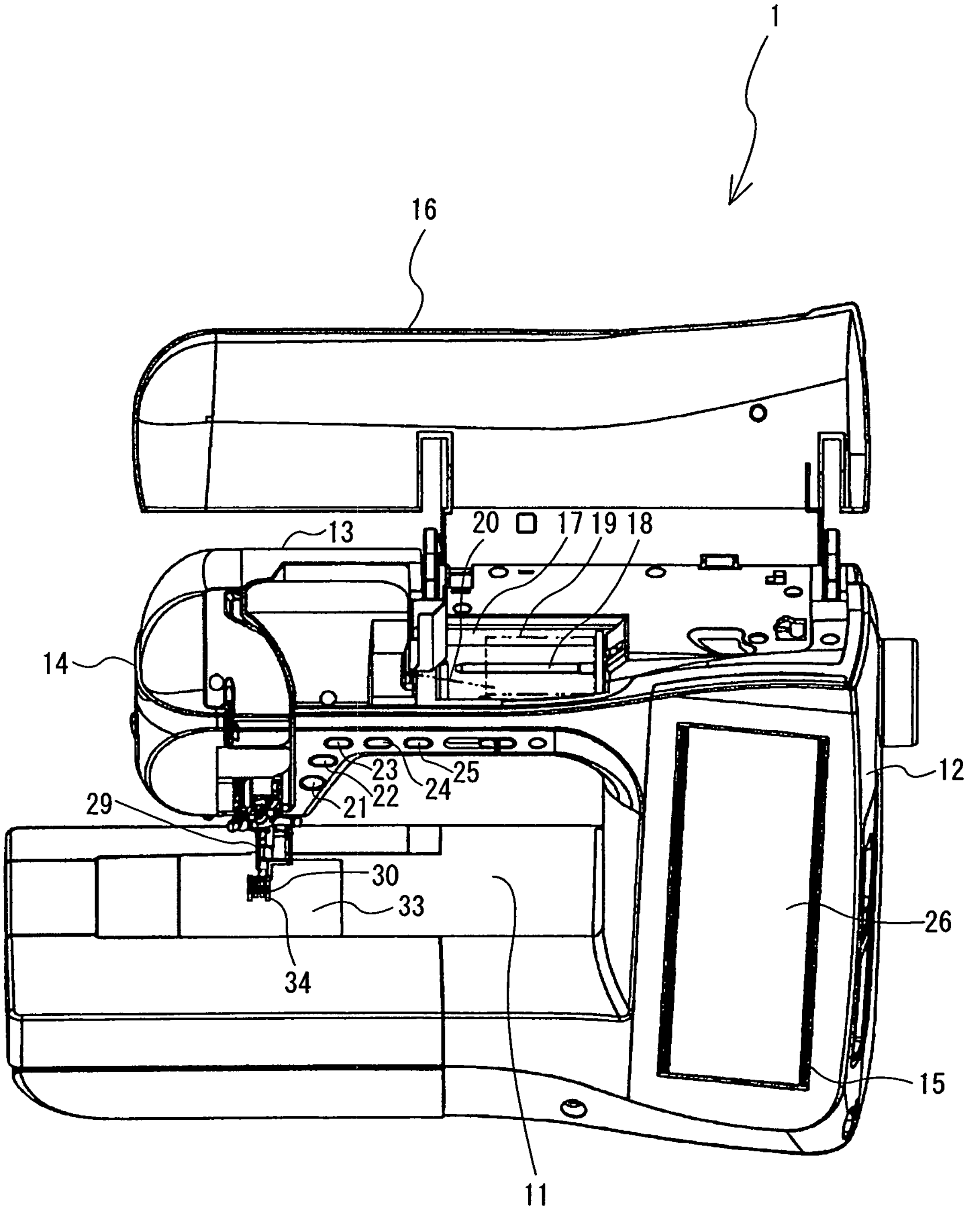
FIG. 1 is a perspective view of a sewing machine with an open/close cover in a condition where the cover is open, as viewed from above the sewing machine.
Figure 2:
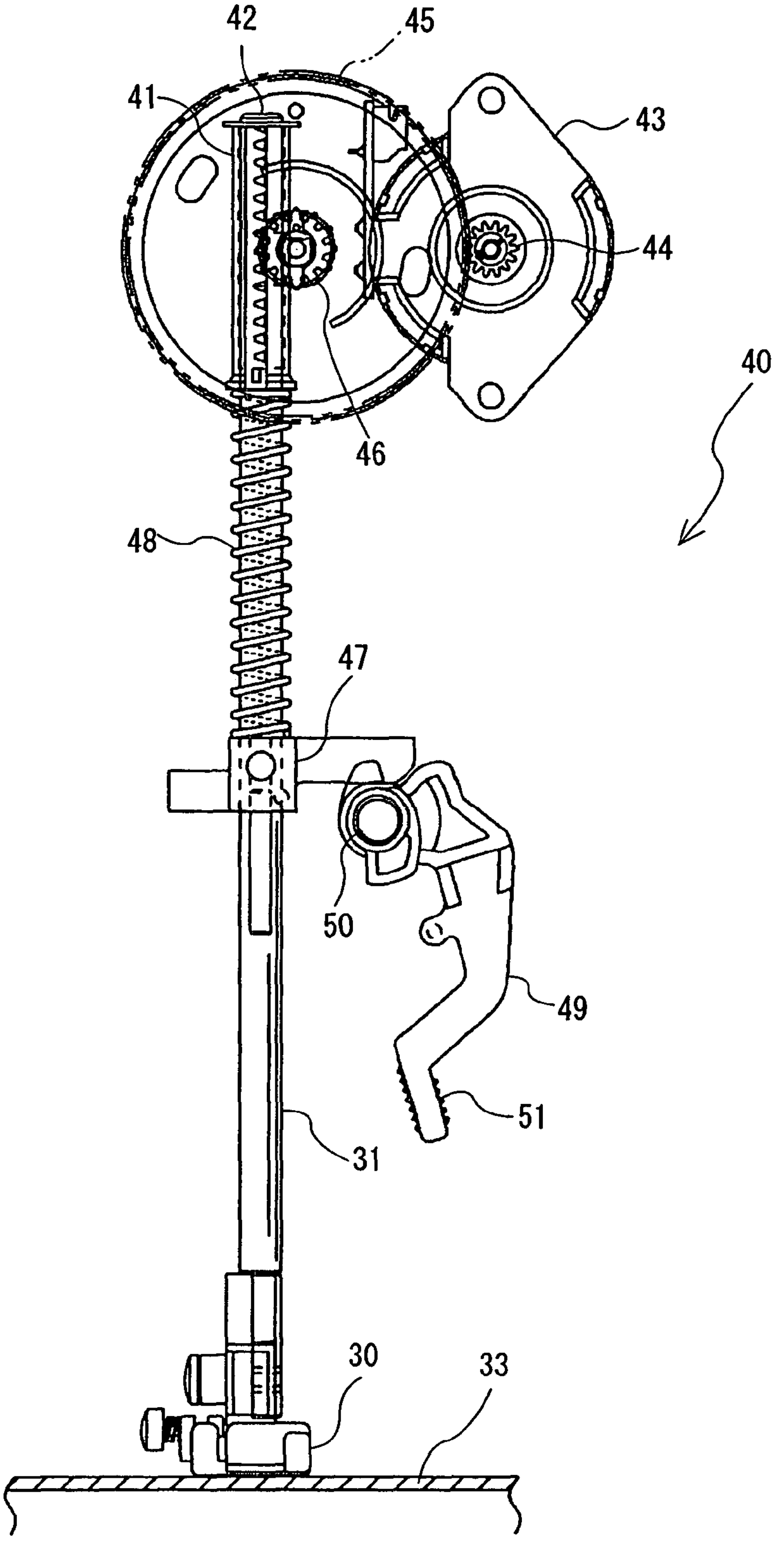
FIG. 2 is a plan view of major components of an elevation mechanism that constitutes the sewing machine and vertically moves a presser foot.

As shown in FIG. 1, the sewing machine 1 may include a horizontally long sewing machine bed 11, a pillar portion 12, an arm portion 13, and a head portion 14. The pillar portion 12 may be erected upward at a right end portion of the sewing machine bed 11. The arm portion 13 may extend leftward in FIG. 1 from an upper end of the pillar portion 12. The head portion 14 may be provided at a left tip portion of the arm portion 13. The sewing machine bed 11 may be equipped with a needle plate 33, a feed dog 34, a feed mechanism, not shown, a feed distance adjustment pulse motor 78 (see FIG. 3), and a shuttle mechanism, not shown. The needle plate 33 may be disposed on an upper surface of the sewing machine bed 11. On a back side of the needle plate 33, the feed dog 34 may be provided to feed a sewing-target work cloth, not shown, as much as a predetermined feed distance so that when the feed dog 34 is driven by a cloth feed mechanism, the feed distance adjustment pulse motor 78 may adjust a feed distance. The head portion 14 may be equipped with a needle bar mechanism, not shown, a needle bar swinging pulse motor 80 (see FIG. 3), and a thread take-up mechanism, not shown. The needle bar mechanism may vertically drive a needle bar, not shown, which is fitted with a sewing needle 29. The needle bar may be swung horizontally by the needle bar swinging pulse motor 80. The above-described mechanisms may be controlled by a control device that includes, for example, a microcomputer, etc., that may be built in the sewing machine 1.

The pillar portion 12 may be equipped with a LCD 15 on its front surface. In a first mode to perform the operational test or display a record of performance of the operational test, the LCD 15 may display, for example, adjustment set values, measured values, a record of performance of the operational test including whether or not the test has been performed, test items, and results of judgment. In a second mode to perform sewing, the LCD 15 may display, for example, a variety of stitch patterns, names of various functions required in sewing, and various messages. The sewing machine 1 may be equipped with a switching device to switch the contents displayed on the LCD 15 between the first mode and the second mode. It thus may be possible to display various kinds of contents about the operational test, which may be displayed in the first mode, without adding a new display device to the sewing machine 1.

On the front surface of the LCD 15, a touch panel 26 having transparent electrodes may be equipped. In the first mode, the transparent electrodes of the touch panel 26 may correspond to, for example, selection screens of the test items of the operational test or display positions of a performance record. Further, in the second mode, the transparent electrodes of the touch panel 26 may correspond to, for example, the pattern names of a plurality of patterns, the names of the various functions to be performed, or the display positions of numeric set values, various setting screens of a feed distance of work cloth by the feed distance adjustment pulse motor 78, a needle stroke by the needle bar swinging pulse motor 80, etc. It may be thus possible to perform various operations by pressing, with the operator's finger or a dedicated touch pen, places on the touch panel 26 that correspond to a pattern display portion or a setting portion on a screen displayed on the LCD 15. Specifically, it may be possible to instruct operations, set values about the performance of the operational test and access a performance record in the first mode. It may also be possible to select patterns, instruct functions, and set values that are involved in sewing in the second mode.

Further, the pillar portion 12 may be equipped with a connector 35 (see FIG. 3) on its right-side surface in FIG. 1. Via the connector 35, it may be possible to add various kinds of sewing data and programs into the sewing machine 1 and remove them from the sewing machine 1. For example, a data storage medium such as a memory card and a HDD unit may be inserted and removed from the sewing machine 1.

Next, a configuration of the arm portion 13 is described. The arm portion 13 may include a cover 16 on the upper surface that opens and closes. The cover 16 may be provided in a longitudinal direction of the arm portion 13 and axially supported at an upper end of the arm portion 13 so that it may be opened and closed around a horizontal shaft. In the vicinity of an upper midsection of the arm portion 13, when the cover 16 is open, a thread reception portion 17 may be provided. The thread reception portion 17 may be concave in order to contain a thread spool 19, which supplies a thread to the sewing machine 1. On an inner wall surface of the thread reception portion 17 on the side of the pillar portion 12, a thread spool pin 18 may be provided that protrudes toward the head portion 14 to attach the thread spool 19. The thread spool 19 may be mounted by inserting the thread spool pin 18 into an insertion hole formed in the thread spool 19. Although it is not shown, needle thread 20 (shown in FIG. 1) extending from the thread spool 19 may be supplied to a sewing needle 29 attached to a needle bar through a thread tensioning device fitted to the head portion 14 that adjusts thread tension, a thread take-up spring, and a plurality of thread hook portions such as thread take-ups that reciprocate vertically to pull up a needle thread.

Further, the arm portion 13 may be fitted with a drive shaft, not shown, of the sewing machine. The drive shaft of the sewing machine may be provided so as to extend in the longitudinal direction of the arm portion 13 and rotary-driven by a sewing machine motor 79 (see FIG. 3). When the drive shaft of the sewing machine revolves, the needle bar mechanism and the thread take-up mechanism may be driven.

At a lower portion of the front surface of the arm portion 13, the sewing machine 1 may include a sewing start/stop switch 21, a reverse stitching switch 22, a needle up-and-down switch 23, a presser foot elevation switch 24, and an automatic thread hooking start switch 25. The sewing start/stop switch 21 may start and stop the operation of the sewing machine, that is, start and stop the sewing. The reverse stitching switch 22 may feed the work cloth from a rear side to a front side, which is opposite to an ordinary direction. The needle up-and-down switch 23 may switch upper and lower positions from each other at which to stop the needle bar. The presser foot elevation switch 24 may instruct elevation of a presser foot 30. The automatic thread hooking start switch 25 may instruct hooking a thread at the thread take-up, the thread tensioning device, and the thread take-up spring, and may instruct the starting of automatic threading for passing a thread through the eyehole in the sewing needle 29.

If a power supply switch (not shown) is turned ON to actuate the sewing machine 1 when the sewing start/stop switch 21, the reverse stitching switch 22, and the needle up-and-down switch 23 are held down at the same time, the sewing machine 1 may be actuated in the first mode. On the other hand, if the sewing machine 1 is actuated using the power supply switch, without pressing the switches mentioned above, it may be actuated in the second mode. In such a manner, in the exemplary embodiment, the sewing machine may be configured to be actuated in the first mode if the power supply switch is turned ON by turning the power supply switch ON when the above-described three buttons are all held down together. It thus may be possible to prevent occurrence of an operator mistakenly actuating the sewing machine in the first mode during operation of the sewing machine 1.

Further, the head portion 14, which may be provided on the arm portion 13 at its upper left tip, may be fitted with the above-described needle bar, thread take-up, thread tensioning device, and thread take-up spring as well as, although not shown, for example, an automatic thread hooking apparatus and an automatic threading mechanism. On the rear side of the needle bar, a presser bar 31 (see FIG. 2) may be disposed, which is supported by the frame of the sewing machine 1 in an elevation-enabled manner. The presser bar 31 may be fitted at its lower end with the presser foot 30, which brings the work cloth into close contact with the feed dog 34 by using an appropriate pushing pressure.

Next, an elevation mechanism 40 that may vertically raise and lower the presser bar 31 is described with reference to FIG. 2. The elevation mechanism 40 may check for appropriate operations in the later-described operational test. As shown in FIG. 2, the elevation mechanism 40 may be disposed behind the needle bar, not shown. The elevation mechanism 40 may be equipped with the presser bar 31, the presser foot 30, a rack formation member 41, and a snap ring 42. The presser bar 31 may be supported by the sewing machine frame in the elevation-enabled manner. The presser foot 30 may be attached to the presser bar 31 at its lower end. The rack formation member 41 may be externally fitted to the presser bar 31 at its upper end in the elevation-enabled manner. The snap ring 42 may be fixed to the presser bar 31 at its upper end. The elevation mechanism 40 may be further equipped with a presser foot elevation pulse motor 43, a drive gear 44, an intermediate gear 45, a pinion 46, a presser bar guide bracket 47, and a presser spring 48. The presser foot elevation pulse motor 43 may be a drive mechanism to raise and lower the presser bar 31. The drive gear 44 may be coupled to the output shaft of the pulse motor 43. The intermediate gear 45 meshes with the drive gear 44. The pinion 46 may be formed integrally with the intermediate gear 45, to mesh with the rack formation member 41. The presser bar guide bracket 47 may be fixed to the presser bar 31 at its vertically middle stage portion. The presser spring 48 may be externally packaged to the presser bar 31 between the rack formation member 41 and the presser bar guide bracket 47. The elevation mechanism 40 may be further equipped with, for example, a presser bar lifter lever 49 and a potentiometer 52 (see FIG. 3). The presser bar lifter lever 49 may manually raise and lower the presser bar 31, independently of the elevation of the presser bar 31 by the presser foot elevation pulse motor 43. Further, the potentiometer 52 may detect an elevated position of the presser bar 31.

The elevation mechanism 40 may be equipped with a presser bar lifter lever 49. One end of the presser bar lifter lever 49 may be supported by a pivotally supporting pin 50 that is firmly fixed to the sewing machine frame in such a manner that it can swing around. At the other end of the presser bar lifter lever 49, an operation portion 51 may be attached for manual operations. When the operation portion 51 is operated manually, the presser bar lifter lever 49 may be swung. It thus may be possible to raise and lower the presser foot 30 between a lowered position where it abuts against the needle plate 33 and a position, which is raised from the needle plate 33 and stands at a predetermined height from the sewing machine bed 11.

On the other hand, the presser bar 31 may be raised and lowered when the presser foot elevation pulse motor 43 is driven, for example, by the following. First, when the presser foot elevation pulse motor 43 is driven, resultant driving force may be transmitted to the intermediate gear 45 and the pinion 46 to raise or lower the rack formation member 41. If the rack formation member 41 is raised, the upper end surface of the rack formation member 41 may raise the snap ring 42 fixed to the upper end of the presser bar 31, thereby raising the presser foot 30. On the other hand, when the presser foot elevation pulse motor 43 is driven to lower the rack formation member 41, the presser spring 48 that abuts against the lower end surface of the rack formation member 41 may be pressed downward. Accordingly, the presser bar guide bracket 47 fixed to the presser bar 31 may also be pressed downward, to press the presser foot 30 down to a lowest position where it abuts against the needle plate 33. It should be noted that in the later-described operational test, a height to which the presser foot 30 is raised may be detected by the potentiometer 52 to confirm whether or not the presser foot 31 is raised or lowered to a predetermined position by driving the presser foot elevation pulse motor 43.

Figure 3:
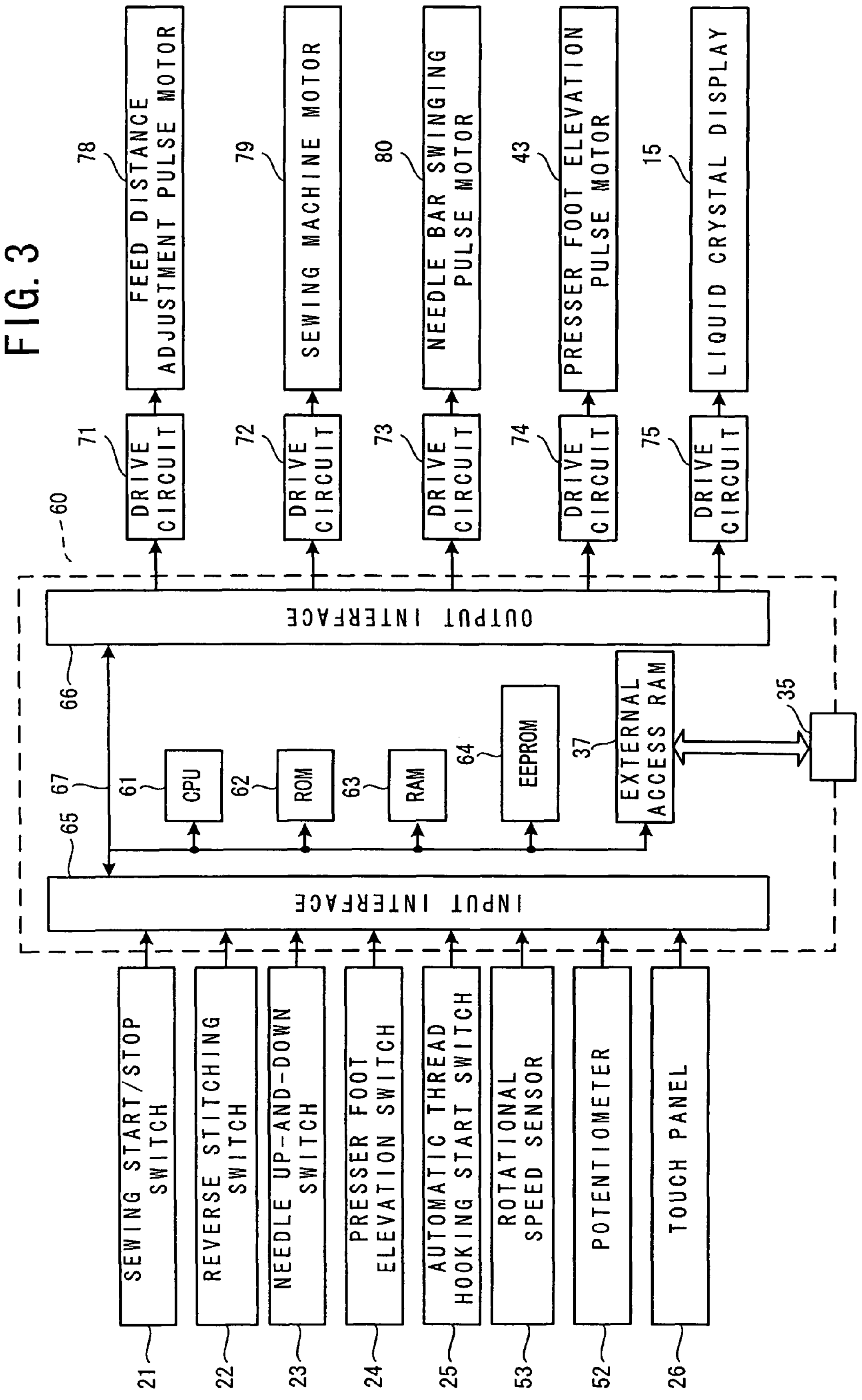
FIG. 3 is a block diagram showing an electrical configuration of the sewing machine.
Figure 4:
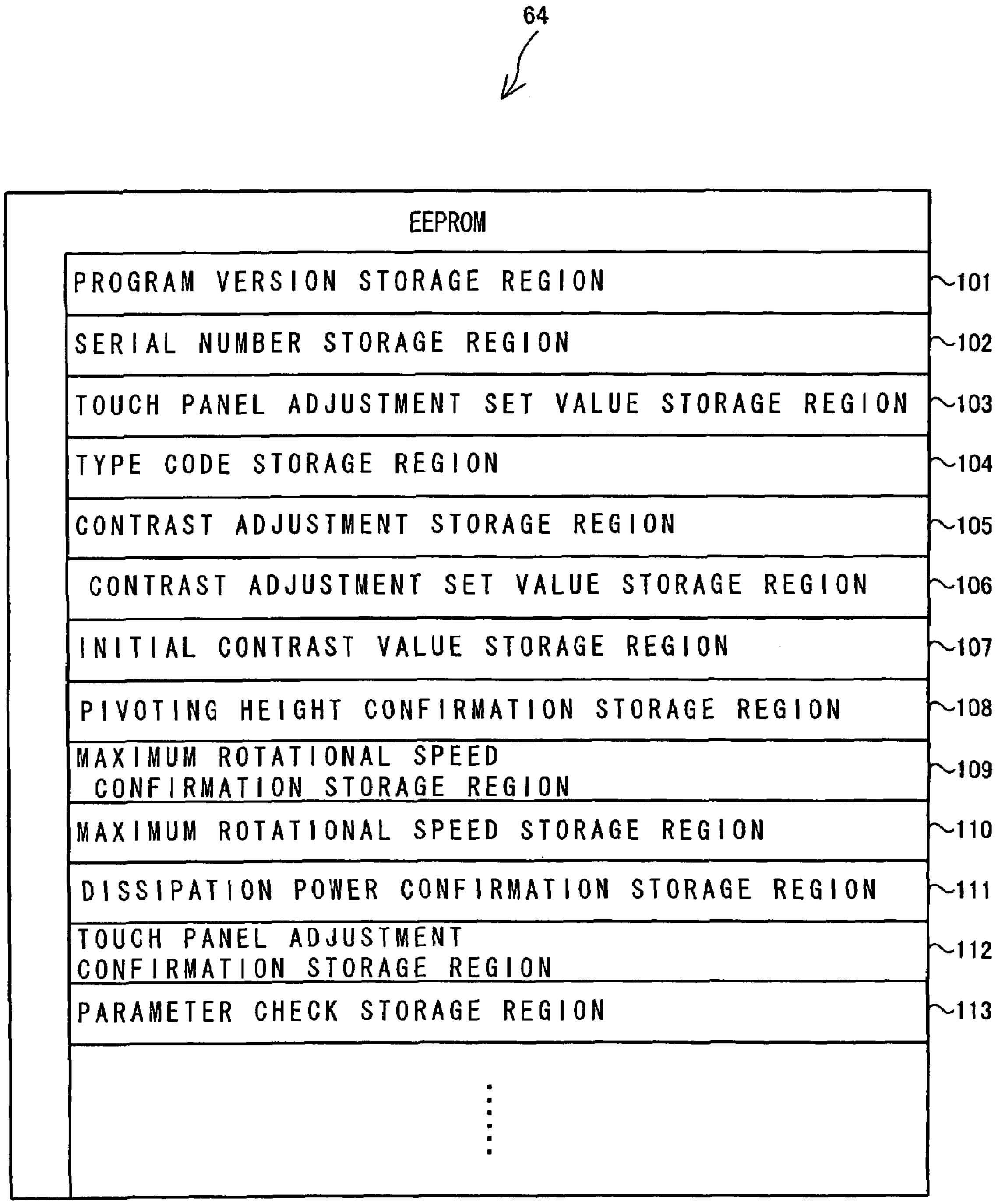
FIG. 4 is an explanatory diagram of storage regions of an EEPROM.

Next, the electrical configuration of the sewing machine 1 is described with reference to FIGS. 3 and 4. As shown in FIG. 3, an apparatus body 60 of the sewing machine 1 may include a CPU 61, a read only memory (ROM) ROM 62, a RAM 63, an EEPROM 64, a connector 35, an external access RAM 37, an input interface 65, an output interface 66, etc., which are connected to each other by a bus 67. Further, the input interface 65 may also have the following connected to it: the sewing start/stop switch 21, the reverse stitching switch 22, the thread up-and-down switch 23, the presser foot elevation switch 24, the automatic thread hooking start switch 25, a revolution speed sensor 53 that measures a revolution speed of the drive shaft of the sewing machine, not shown, the potentiometer 52, and the touch panel 26. On the other hand, the output interface 66, a feed distance adjustment pulse motor 78, a sewing machine motor 79 that rotary-drives the drive shaft of the sewing machine and a needle bar swinging pulse motor 80 that swings and drives the needle bar, presser foot elevation pulse motor 43 and the LCD 15, respectively, may be electrically connected, via drive circuits 71 to 75.

The CPU 61 may conduct main control over the sewing machine 1 and in the first mode, may perform various operations and processings in accordance with an operational test program stored in an operational test program storage region in the ROM 62. In the second mode, the CPU 61 may perform various operations and processing for sewing in accordance with a sewing control program stored in a sewing control program storage region in the ROM 62. The operational test program may be stored in an external storage device such as a memory card, in which case this program will be read into the RAM 63 and executed. Further, the CPU 61 may cause the LCD 15 to display a record of performance of the test item of the operational test selected on the touch panel (as described later). The CPU 61 may further determine pass-or-fail of each test item based on the performance record stored in the later-described EEPROM 64 and acceptance criteria stored in the ROM 62 and display a result of the determination on the LCD 15. Moreover, the CPU 61 may determine pass-or-fail of all the test items and display a result of the determination on the LCD 15.

The ROM 62 may include the sewing control program storage region, the operational test program storage region, etc. In the sewing control program storage region, a sewing control program may be stored that conducts drive control on a variety of drive mechanisms, pattern selection control on selection of patterns to be sewn, and various display control. On the other hand, in the operational test program storage region may store beforehand, for example, an operational test program with respect to the later-described operational test according to the exemplary embodiment, test items, and acceptance criteria corresponding to the test items.

The RAM 63 may be a random access memory. As necessary, the RAM 63 may be provided with a sewing-target pattern data storage region (not shown) to store data of patterns to be sewn and various storage regions to store results of operations processed by the CPU 61.

The EEPROM 64 may be an electrically erasable and programmable nonvolatile memory and provided with a storage region to store records of performance of the operational test in accordance with the present disclosure. Details of the EEPROM 64 are described, for example, with reference to FIG. 4. As shown in FIG. 4, the EEPROM 64 may include a program version storage region 101, a serial number storage region 102, and a type code storage region 104. The program version storage region 101 may hold a version of a program stored in the ROM 62. The serial number storage region 102 may hold a serial number, which is a symbol specific to the sewing machine. The type code storage region 104 may hold a type code of the sewing machine 1. The EEPROM 64 may be further provided with a touch panel adjustment set value storage region 103. The touch panel adjustment set value storage region 103 may hold adjustment set values during adjustment of a display position of an image displayed on the LCD 15 at the time of a manufacture process and a position recognized by the touch panel 26. Further, a storage region that stores records of performance of the operational test, which is described later with reference to FIGS. 6 and 7, may be provided. The storage region may include: a contrast adjustment storage region 105, a contrast adjustment set value storage region 106, an initial contrast value storage region 107, a pivoting height confirmation storage region 108, a maximum rotational speed confirmation storage region 109, a maximum rotational speed storage region 110, a dissipation power confirmation storage region 111, a touch panel adjustment confirmation storage region 112, and a parameter check storage region 113.

Next, a method for managing manufacture of the sewing machine 1, as described above, is described with reference to the drawings. The above-described sewing machine 1 has functions of a sewing machine in accordance with the exemplary embodiments. A program that causes a manufacture process shown in FIG. 5 and an adjustment confirmation process shown in FIG. 6 to be performed may be stored in the ROM 62 and executed by the CPU 61 shown in FIG. 3.

Figure 5:
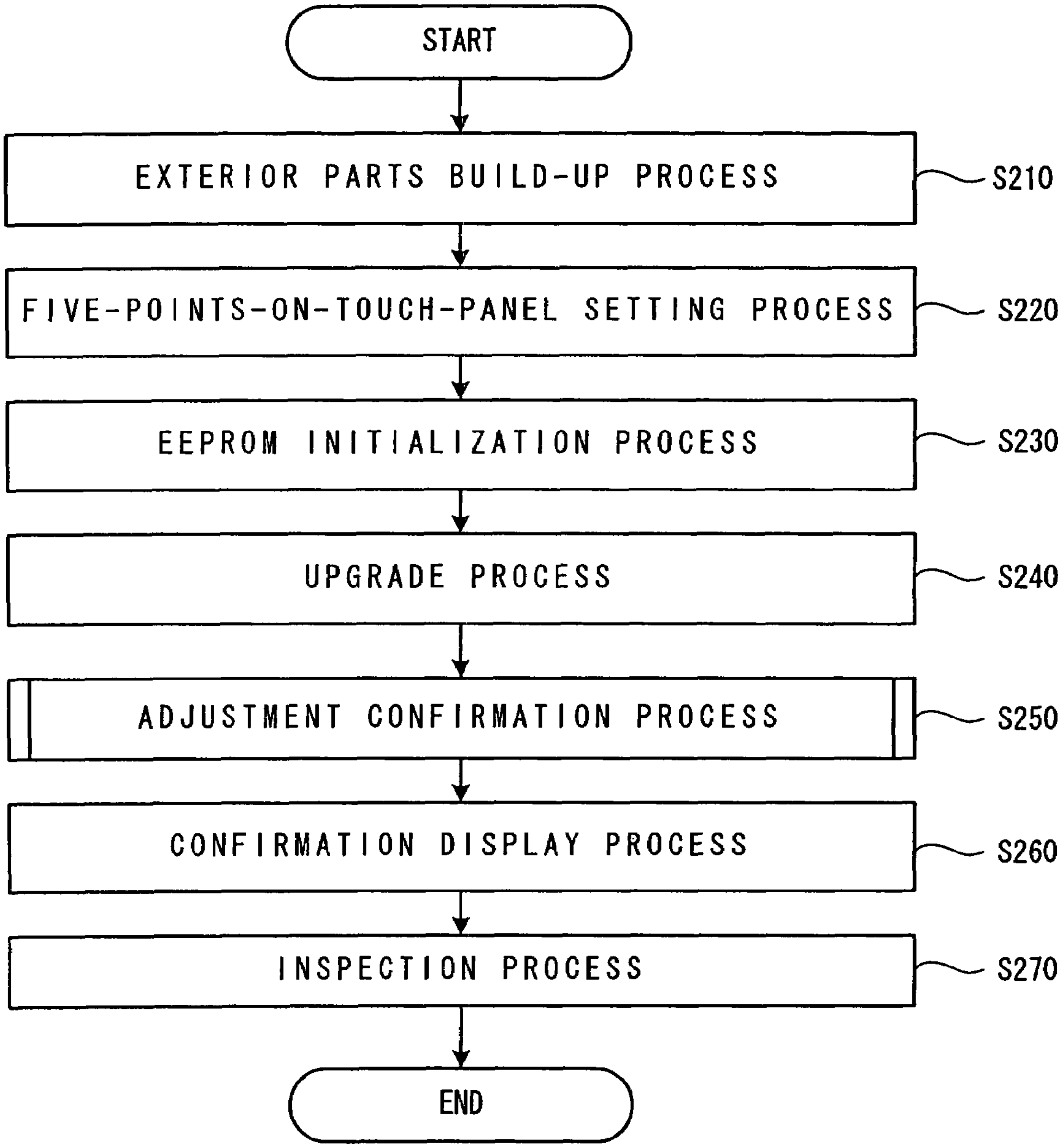
FIG. 5 is a flowchart showing a flow of a manufacture process of the sewing machine according to the present disclosure.

In the manufacture process of the sewing machine 1, as shown in FIG. 5, an assembly process to assemble the mechanisms in the sewing machine 1 may be first performed and followed by an exterior parts build-up process (S210) for building up exterior parts of the sewing machine 1.

A five-points-on-touch-panel setting process (S220) may check on whether or not there is predetermined correspondence between a screen displayed on the LCD 15 and a screen position recognized by the touch panel 26 arranged in front of the LCD 15 in the sewing machine 1. If there is no predetermined correspondence, the setting process may adjust a parameter that correlates a position sensor of the touch panel 26 with the coordinates of a touched position recognized by the position sensor. The adjusted set value may then be stored in the touch panel adjustment set value storage region 103 in the EEPROM 64. If the process ends normally, a system that manages the five-points-on-touch-panel setting process may assign the sewing machine 1 a type code and a serial number, which are unique to each sewing machine. Then, the type code and the serial number may be stored in the type code storage region 104 and the serial number storage region 102 in the EEPROM 64, respectively.

In an EEPROM initialization process (S230), a system that manages the EEPROM initialization process may initialize the EEPROM 64. First, the type code storage region 104 in the EEPROM 64 may be referred to in order to determine whether or not the type code is normally stored beforehand in the sewing machine 1. If the type code is not normally stored beforehand, an error may be displayed on the LCD 15 of the sewing machine 1. On the other hand, if the type code is normally stored beforehand, the system that manages the EEPROM initialization process may create an initialization file and add initialization data to it, and transfer it to the sewing machine 1. If the transfer ends normally, the touch panel adjustment set value of the sewing machine 1 stored at the five-points-on-touch-panel setting process (S220) and the serial number stored beforehand in the serial number storage region 102 may be outputted to the outside of the sewing machine 1, for example, displayed on the LCD 15 or outputted to a computer.

Then, in an upgrade process (S540), an upgrade request flag used for generating the file may be set in a predetermined storage region in the RAM 63. In the following upgrade process (S240), when an upgrade screen is started up, an empty file may be created in the external access RAM 37. A management system that manages the upgrade process may confirm presence of the empty file and then delete it and transfer an upgrade file to the sewing machine 1. If the upgrade file is transferred to the sewing machine 1 and the upgrade process ends normally, the management system that manages the upgrade process may clear the upgrade request flag, which was set when the EEPROM initialization process (S230) ended.

Next, in a manufacture process adjustment confirmation process (S250) shown in FIG. 5, the operational test may be performed on the test items stored in the ROM 62. The adjustment confirmation process is described in detail with reference to FIG. 6 through FIG. 16. The ROM 62 of the sewing machine 1 may store beforehand at least six test items as shown in FIG. 7, for example, LCD contrast adjustment ("01"); pivoting operation confirmation ("02"); maximum rotational speed confirmation ("03"); dissipation power confirmation ("04"); touch panel adjustment confirmation ("05"); and parameter default confirmation ("06"). The LCD contrast adjustment may adjust a contrast of the LCD 15. The pivoting operation confirmation may confirm whether or not the presser foot 30 operates properly. The maximum rotational speed confirmation may measure a maximum rotational speed of the drive shaft of the sewing machine during operation and confirms whether or not the measured maximum rotational speed is equal to a predetermined maximum rotational speed. The dissipation power confirmation may measure a dissipation power of the sewing machine during its operation. The touch panel adjustment confirmation may confirm whether or not there is predetermined correspondence between a display position of an image displayed on the LCD 15 and an image position recognized by the touch panel 26. The parameter default confirmation may confirm whether or not all of parameters stored in the EEPROM 64 beforehand are the same as default values stored beforehand in the ROM 62.

Figure 6:
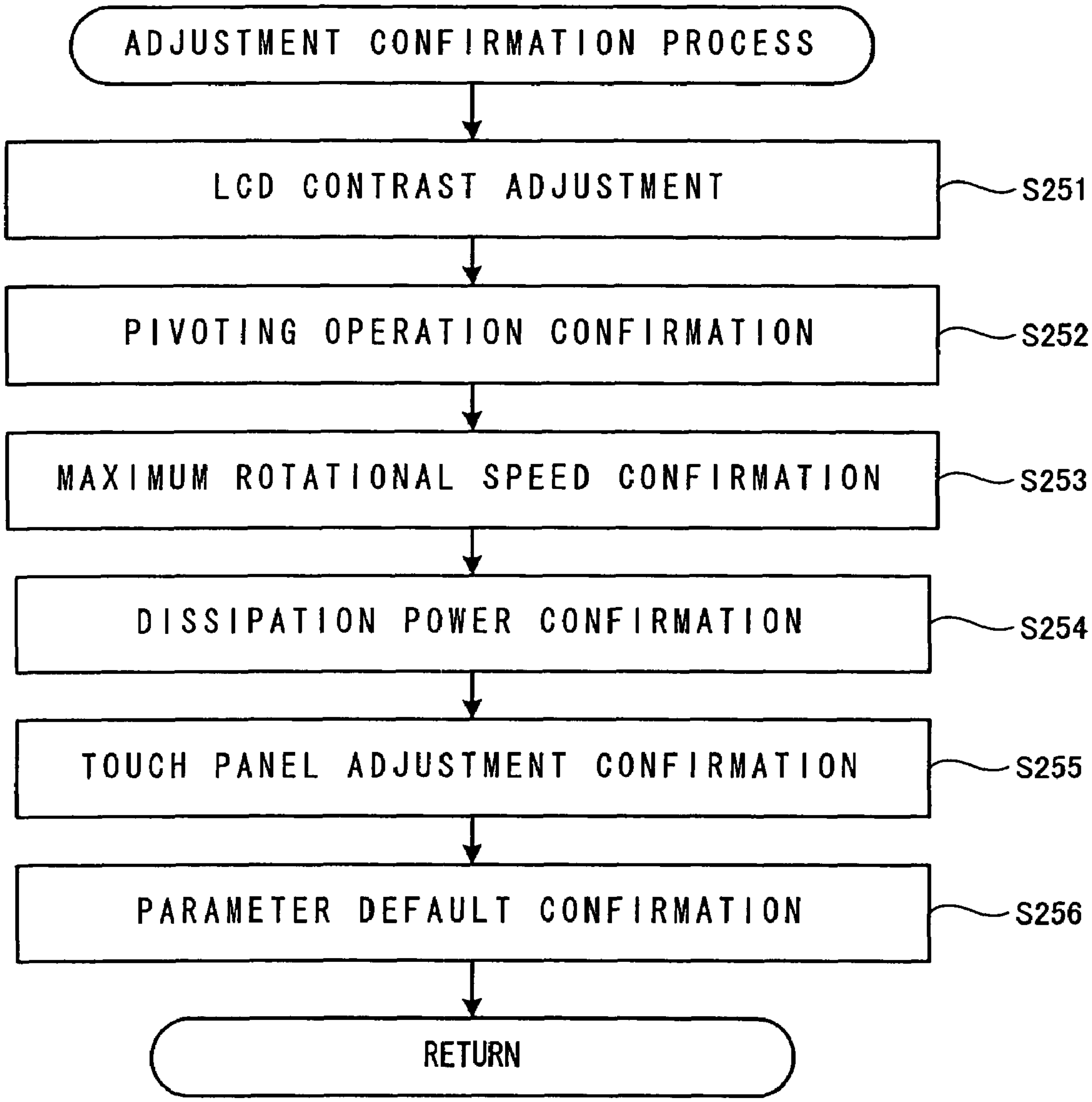
FIG. 6 is a flowchart showing an order in which to perform an operational test during an adjustment confirmation process.

In the exemplary embodiment, the operational test may be performed on the six test items shown in FIG. 7 in accordance with a flowchart shown in FIG. 6. The adjustment confirmation process may be carried out to perform all of the test items in the order of the flowchart shown in FIG. 6 and may be carried out by omitting some of the test items or changing the order of the test items. Further, even in a case where the order of the flowchart shown in FIG. 6 is not followed, it may be possible to store a record of performance of the operational test for each of the test items.

In the adjustment confirmation process shown in FIG. 6, first an operator turns on the power supply switch, not shown, when the sewing start/stop switch 21, the reverse stitching switch 22, and the needle up-and-down switch 23, which are disposed at the lower part of the front surface of the arm portion 1 of the sewing machine 1, are all held down at the same time, thereby actuating the sewing machine 1 in the first mode. On the LCD 15, a selection screen 500 may appear for selecting the test items shown in FIG. 8. Numerals ("01"-"08") enclosed by a square shown in FIG. 8 displayed on the LCD 15 correspond to the numbers of the test items stored in the ROM 62 shown in FIG. 7. For example, number "01" corresponds to the LCD contrast adjustment, number "02" corresponds to the pivoting operation confirmation, number "03" corresponds to the maximum rotational speed confirmation, number "04" corresponds to the dissipation power confirmation, number "05" corresponds to the touch panel adjustment confirmation, and number "06" corresponds to the parameter default confirmation. Number "07" displayed at a lower part of the selection screen 500 may correspond to displaying the overall determination results that indicate a result of the operational test for each of the test items, i.e., whether or not the operational test has been performed properly on all of the test items.

Figure 8:
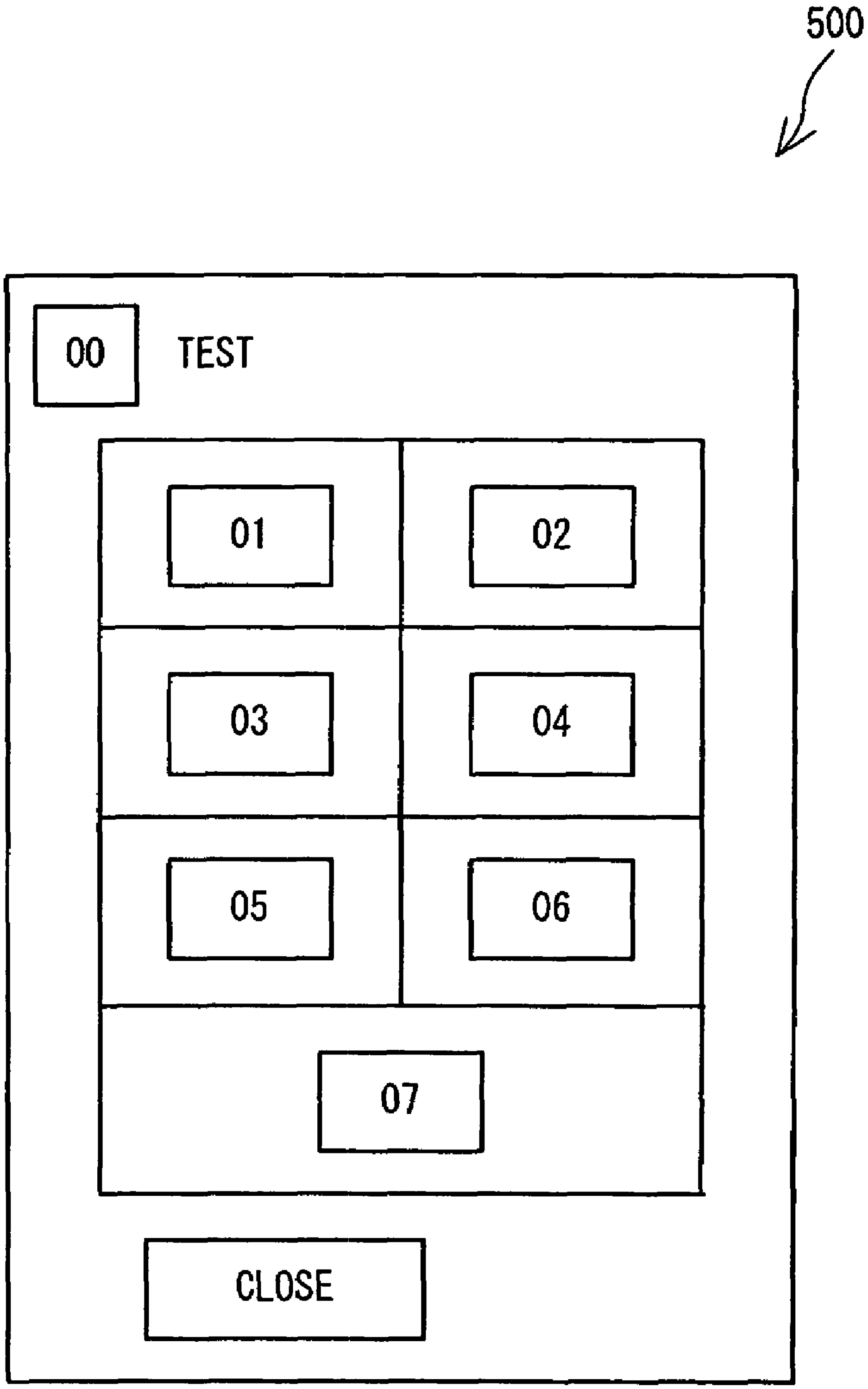
FIG. 8 is an explanatory diagram of a selection screen for selecting the test items displayed on a liquid crystal display (LCD)
Figure 9:
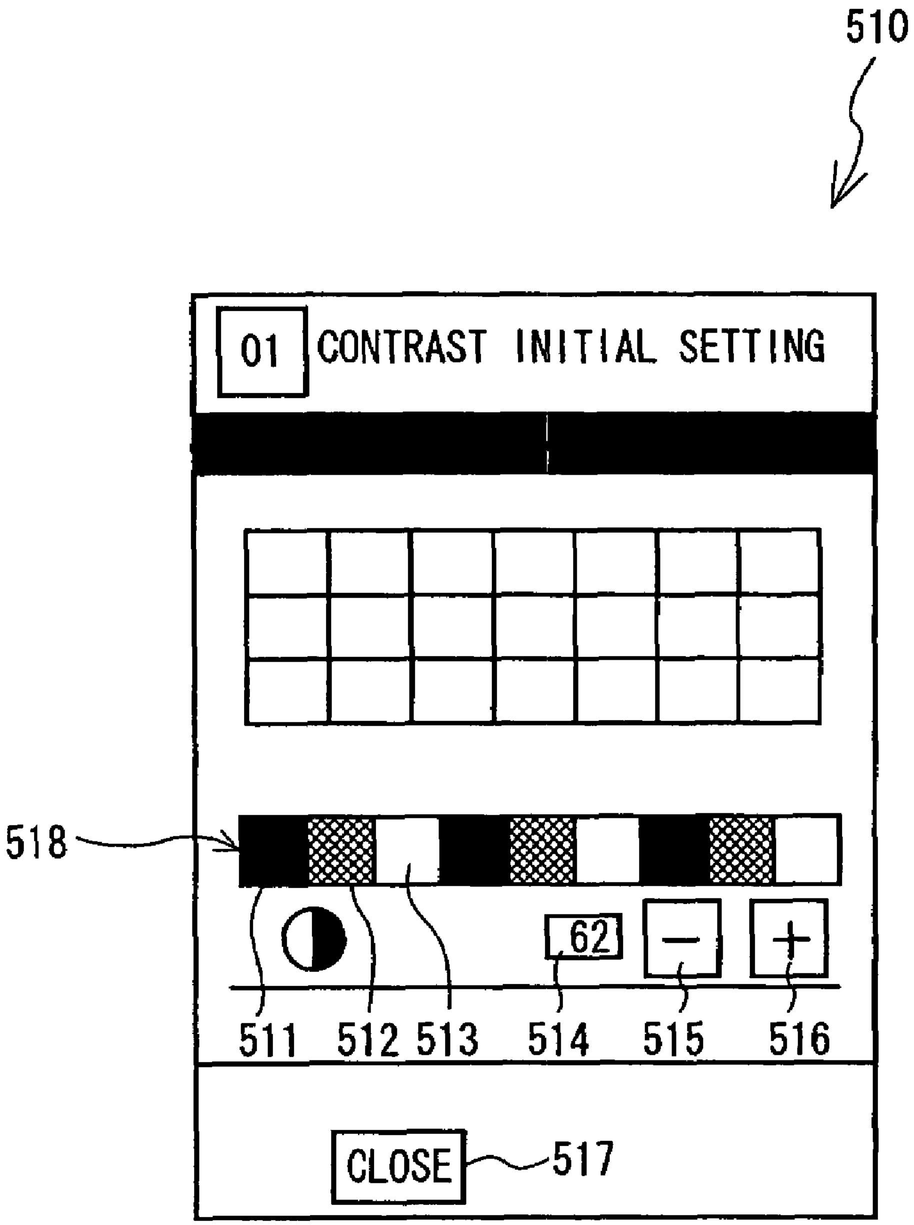
FIG. 9 is an explanatory illustration of a screen which is displayed on the LCD in a case where the test item of LCD contrast adjustment is selected.

First, at S251, the operator may select "01" on the selection screen 500 displayed on the LCD 15 shown in FIG. 8. Then, the CPU 61 may display a screen 510 that corresponds to the LCD contrast adjustment (S251) shown in FIG. 9. This operational test may adjust a contrast of the LCD 15. As shown in FIG. 7, the acceptance criterion of LCD contrast adjustment, stored in the ROM 62 beforehand, may be that the screen 510 shown in FIG. 9 must be displayed. In this LCD contrast adjustment, an operation of the operational test and the acceptance criterion may be compared with each other. Therefore, if the screen 510 shown in FIG. 9 is displayed, the CPU 61 may determine that LCD contrast adjustment has ended normally. Then, as a result of performance of the operational test, the proper completion of the performance may be stored in the contrast adjustment storage region 105 of the EEPROM 64. The performance record stored as indicative of being-already-performed in the contrast adjustment storage region 105 of the EEPROM 64 may include information that indicates whether or not the relevant test has been performed and also information that results from the determination by the CPU 61. Therefore, it is possible to refer to a performance record stored in the contrast adjustment storage region 105, thereby confirming both whether or not LCD contrast adjustment has been performed and how the determination has turned out. Further, if a number corresponding to an already performed operational test is selected by the operator on the selection screen 500 displayed on the LCD 15 shown in FIG. 8, the CPU 61 may display records of the performance of the already performed operational test on each of screens. Therefore, it may be possible to prevent mistakenly repeating a specific operational test. This may also apply to performance records relating to the other test items.

At S251, the screen 510 shown in FIG. 9 may be displayed on the LCD 15 and then a test display region 518 displayed at the center of the screen 510 may be confirmed by the operator. Specifically, the operator may confirm whether or not a gray region 512 in the test display region 518 indicates a medial contrast between those of both-side adjacent black region 511 and white region 513. If it is necessary to adjust the contrast, it may be adjusted by the operator who selects a contrast adjustment key 515 or 516. A contrast adjustment quantity 514 at this time may be displayed. If an optimal LCD contrast is confirmed, the operator may select a CLOSE button 517 to return to the selection screen 500 shown in FIG. 8. In this case, a value of the contrast adjustment quantity 514 may be stored in the contrast adjustment set value storage region 106 as an adjustment set value contained in the performance record.

Subsequently, the operator selects "02" on the selection screen 500 displayed on the LCD 15 shown in FIG. 8, so that the CPU 61 may cause a screen 520 corresponding to the pivoting operation confirmation shown in FIG. 10 to be displayed. This operational test may confirm whether or not a pivoting operation is performed properly (S252). The pivoting operation refers to, for example, the presser foot elevation pulse motor 43 operating upon the stop of the sewing operation and to raise the presser foot 30 to a predetermined height taking into account a thickness of cloth. This operation may save a labor of manually operating the operation portion 51 of the presser bar lifter lever 49 to thereby raise the presser foot 30 in a case where the operator would like to change a sewing direction when operating the sewing machine 1. A height of the presser foot 30 when the sewing is stopped may be detected by the potentiometer 52 (see FIG. 3) and displayed on the LCD 15 as described above. In this operational test, a screen 520 shown in FIG. 10 may be displayed on the LCD 15. Then, when the operation of the sewing machine is stopped, it may be confirmed whether or not the presser foot 30 rises to the predetermined height. On the other hand, as shown in FIG. 7, an acceptance criterion of pivoting operation confirmation stored in the ROM 62 beforehand may be that an OK button 521 indicated on the screen 520 shown in FIG. 10 must be pressed by the operator. In this test item of pivoting operation confirmation, whether or not the OK button 521 may be pressed by the operator is determined.

Figure 10:
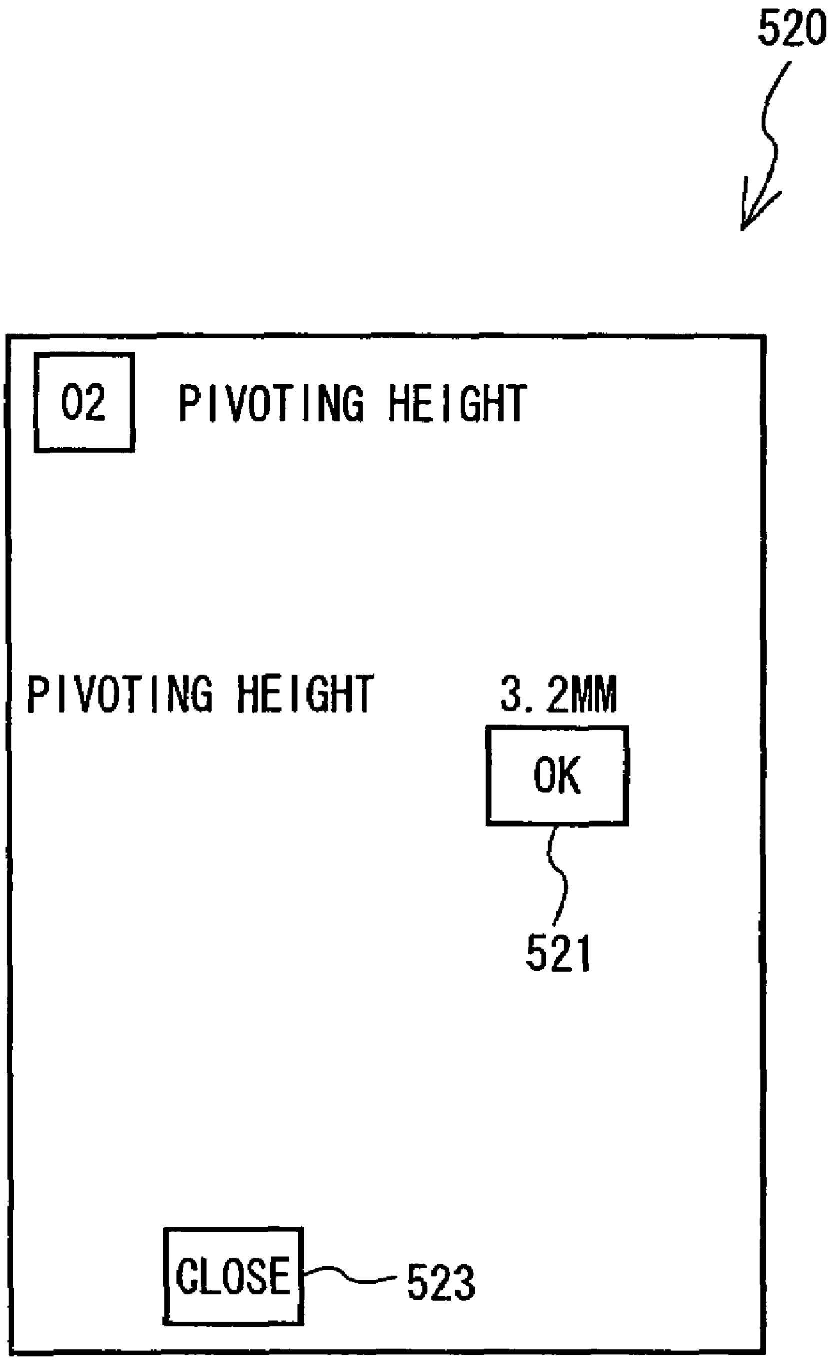
FIG. 10 is an explanatory illustration of a screen which is displayed on the LCD in a case where the test item of pivoting operation confirmation is selected.

At S252, the operator may confirm whether or not the presser foot 30 displayed on the LCD 15 when the operation of the sewing machine 1 is stopped in a condition where the screen 520 shown in FIG. 10 is displayed is at a predetermined height. If the operator determines that the presser foot 30 displayed on the screen 520 is at the predetermined height and the OK button 521 is selected, the CPU 61 may determine that the pivoting operation confirmation has ended normally. Then, a performance record indicative of already-being-performed may be stored in the pivoting height confirmation storage region 108 in the EEPROM 64. If a CLOSE button 523 shown in FIG. 10 is selected by the operator subsequently, the display on the LCD 15 may return to the selection screen 500 shown in FIG. 8.

Subsequently, if "03" is selected by the operator on the selection screen 500 displayed on the LCD 15 shown in FIG. 8, the CPU 61 may display a screen 530 that corresponds to the maximum rotational speed confirmation shown in FIG. 11. The test item may measure a maximum rotational speed of the drive shaft of the sewing machine, not shown, when it is being operated and confirm whether or not the measured maximum rotational speed is equal to a predetermined maximum rotational speed (S253). An acceptance criterion of confirmation of a maximum rotational speed that falls within a range between 950 rpm and 1050 rpm may be stored beforehand in the ROM 62 as shown in FIG. 7. In this maximum rotational speed confirmation, a performance record and the acceptance criterion may be compared with each other. The performance record compared with the acceptance criterion may be stored in the sewing machine 1. Therefore, it may be possible to use the performance record stored in the EEPROM 64 beforehand, temporarily stored in the RAM 63 or any other storage region before being stored in the EEPROM 64.

Figure 11:
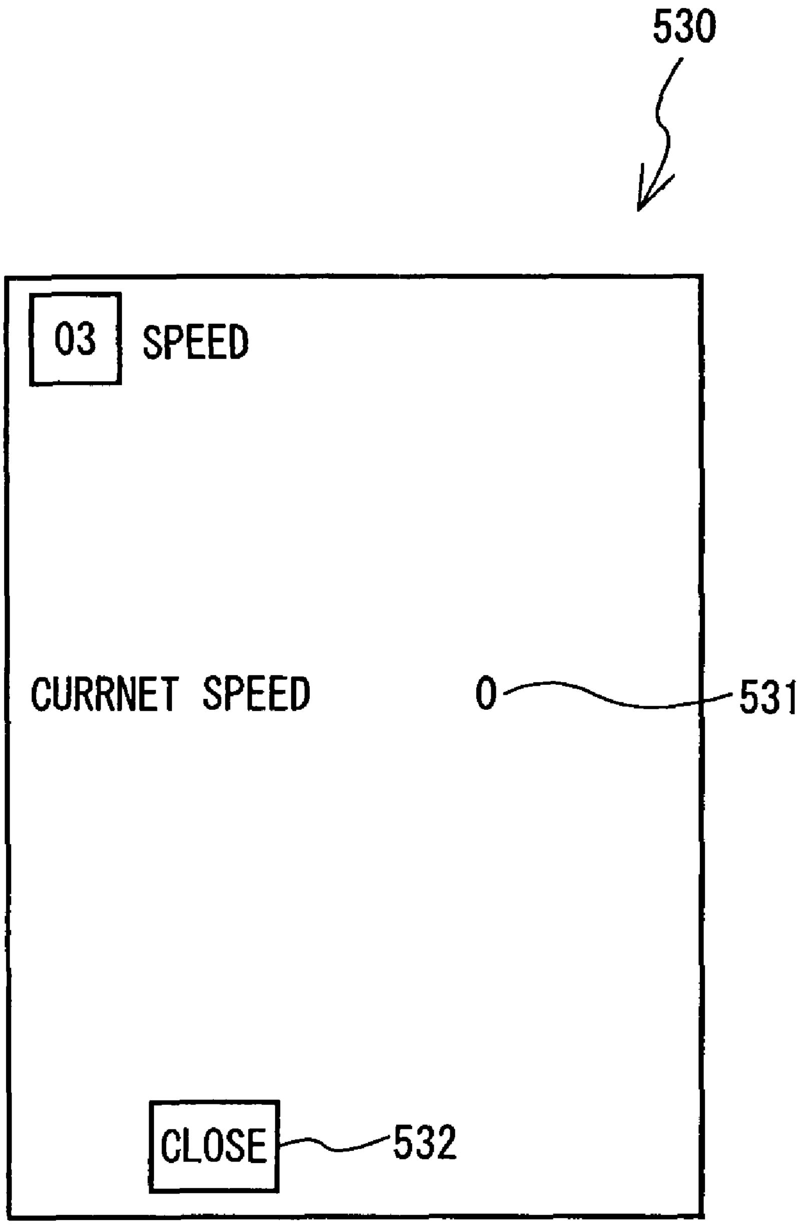
FIG. 11 is an explanatory illustration of a screen which is displayed on the LCD in a case where the test item of maximum rotational speed confirmation is selected.

At S253, if the operator starts operating the sewing machine in a condition where the screen 530 shown in FIG. 11 is displayed, the LCD 15 may display a maximum rotational speed 531 of the drive shaft of the sewing machine, not shown, measured by the speed sensor 53. If the maximum rotational speed 531 falls within the range between 950 rpm and 1050 rpm, the determination device may determine that the acceptance criterion stored in the ROM 62 beforehand is satisfied. Then, a performance record indicative of being-already-performed may be stored in the maximum rotational speed confirmation storage region 109 in the EEPROM 64 and the maximum rotational speed 531 may be stored in the maximum rotational speed storage region 110 as a measured value to be contained in a performance record. If CLOSE button 532 shown in FIG. 11 is selected by the operator subsequently, display on the LCD 15 may return to the selection screen 500 shown in FIG. 8.

Figure 12:
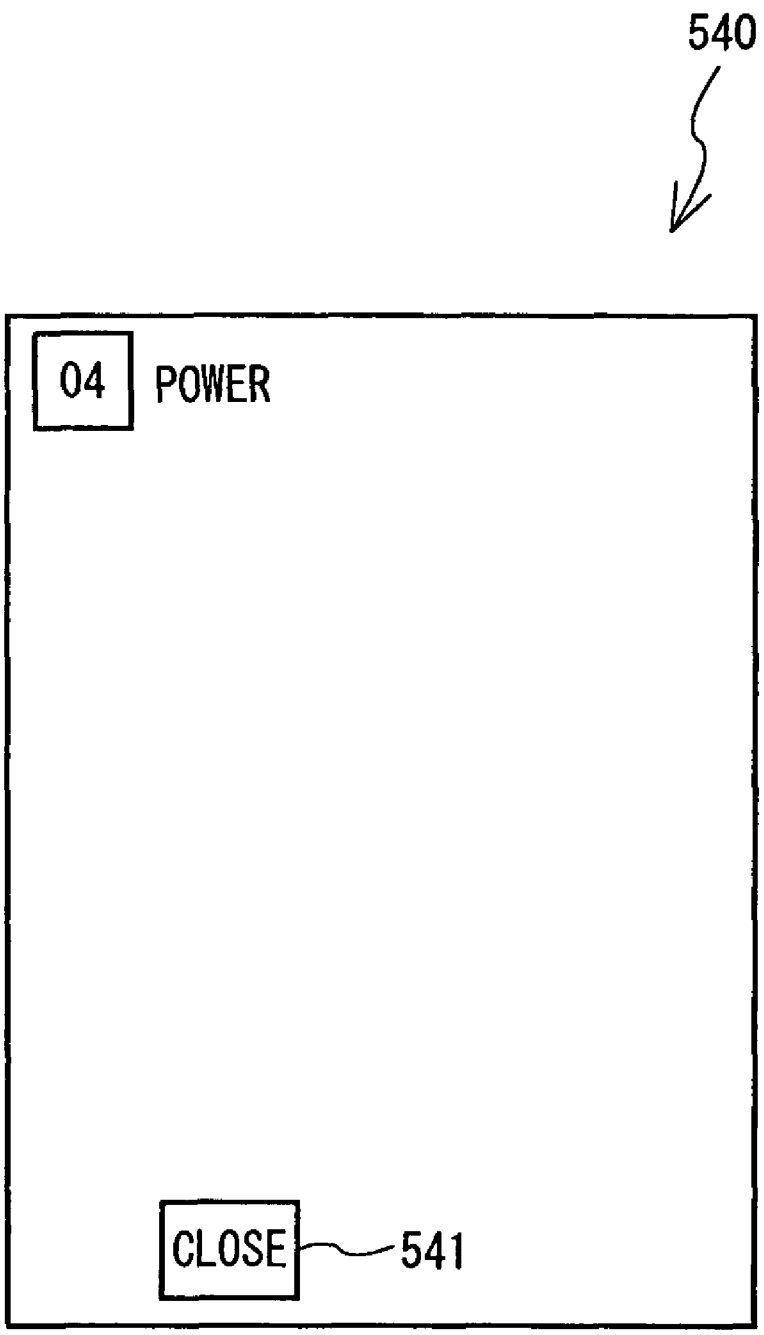
FIG. 12 is an explanatory illustration of a screen which is displayed on the LCD in a case where the test item of dissipation power confirmation is selected.

Subsequently, if "04" is selected by the operator on the selection screen 500 displayed on the LCD 15 shown in FIG. 8, the CPU 61 may display a screen 540 that corresponds to the dissipation power confirmation shown in FIG. 12. A dissipation power of the sewing machine when it is being operated, may be measured (S254). In the operational test, a power meter may be connected to the sewing machine 1 in a condition when the screen 540 shown in FIG. 12 is displayed, a dissipation power of the sewing machine, when it is being operated, may be measured with the power meter. As shown in FIG. 7, an acceptance criterion of dissipation power confirmation that is stored in the ROM 62 beforehand may be an operation of the sewing machine 1 must be started when the screen 540 shown in FIG. 12 is displayed. In the dissipation power confirmation, an operation of the operational test and the acceptance criterion may be compared with each other. Therefore, if the operation of the sewing machine 1 is started in a condition where the screen 540 shown in FIG. 12 is displayed, the CPU 61 may determine that the acceptance criterion stored in the ROM 62 is satisfied. Then, a performance record indicative of being-already-performed may be stored in the dissipation power confirmation storage region 111 in the EEPROM 64. If a CLOSE button 541 shown in FIG. 12 is selected by the operator subsequently, display on the LCD 15 may return to the selection screen 500 shown in FIG. 8.

Figure 13:
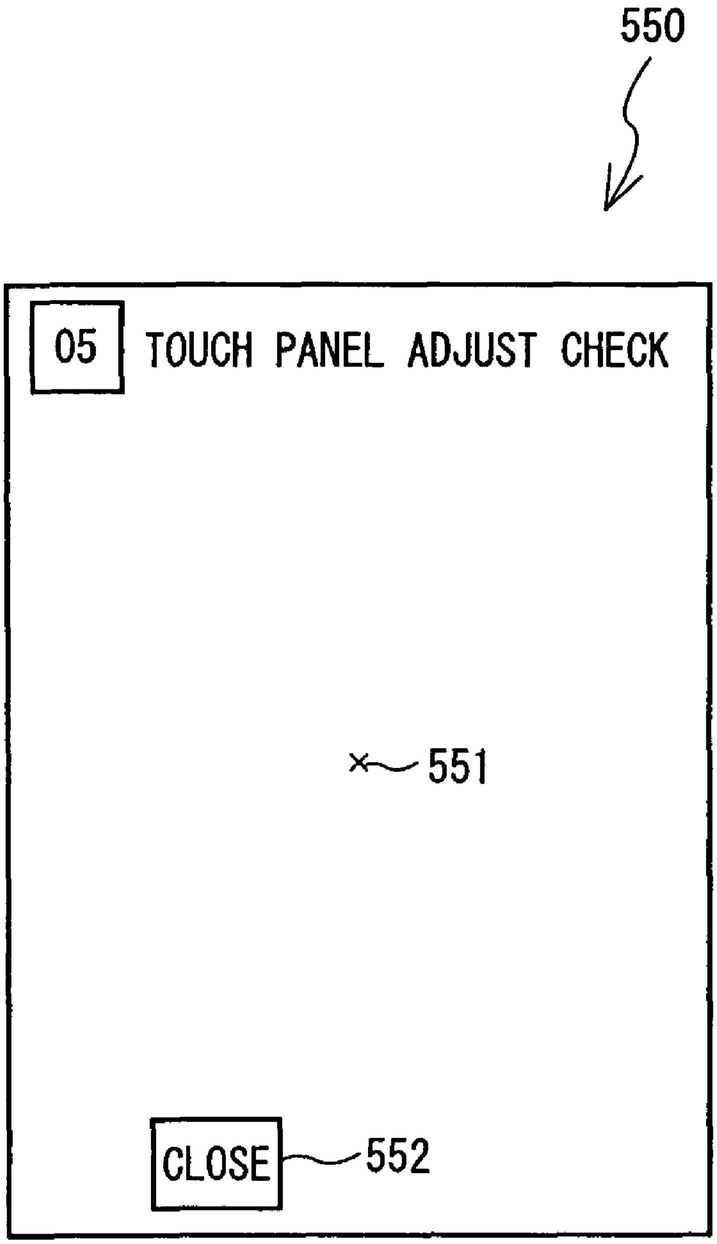
FIG. 13 is an explanatory illustration of a screen which is displayed on the LCD in a case where the test item of touch panel adjustment confirmation is selected.

Subsequently, if "05" is selected by the operator on the selection screen 500 displayed on the LCD 15 shown in FIG. 8, the CPU 61 may display a screen 550 that corresponds to the touch panel adjustment confirmation shown in FIG. 13. In this operational test, the operator may confirm whether or not a display position of an image displayed on the LCD 15 and a position of the image recognized by the touch panel 26 have predetermined correspondence between themselves (S255). As shown in FIG. 7, an acceptance criterion of the touch panel adjustment confirmation stored in the ROM 62 may be when a cross mark 551 indicated at the center of the screen 550 shown in FIG. 13 is pressed by the operator, there must not be an X-directional shift of more than three dots and a Y-directional shift of more than four dots between the pressed position recognized by the touch panel 26 and a display position of the cross mark stored in the ROM 62. In the touch panel adjustment confirmation, a shift between a performance record may not be stored in the EEPROM 64, that is, a pressed position recognized by the touch panel 26 and a display position of the cross mark stored in the ROM 62 may be compared with the acceptance criterion. Therefore, if the CPU 61 determines that a shift between a pressed position recognized by the touch panel 26 when the cross mark 551 is pressed with the finger or touch pen by the operator and a display position of the cross mark stored in the ROM 62 satisfies the acceptance criterion, a performance record indicative of being-already-performed may be stored in the touch panel adjustment confirmation storage region 112 in the EEPROM 64. If a CLOSE button 552 shown in FIG. 13 is selected by the operator subsequently, display on the LCD 15 may return to the selection screen 500 shown in FIG. 8.

Figure 14:
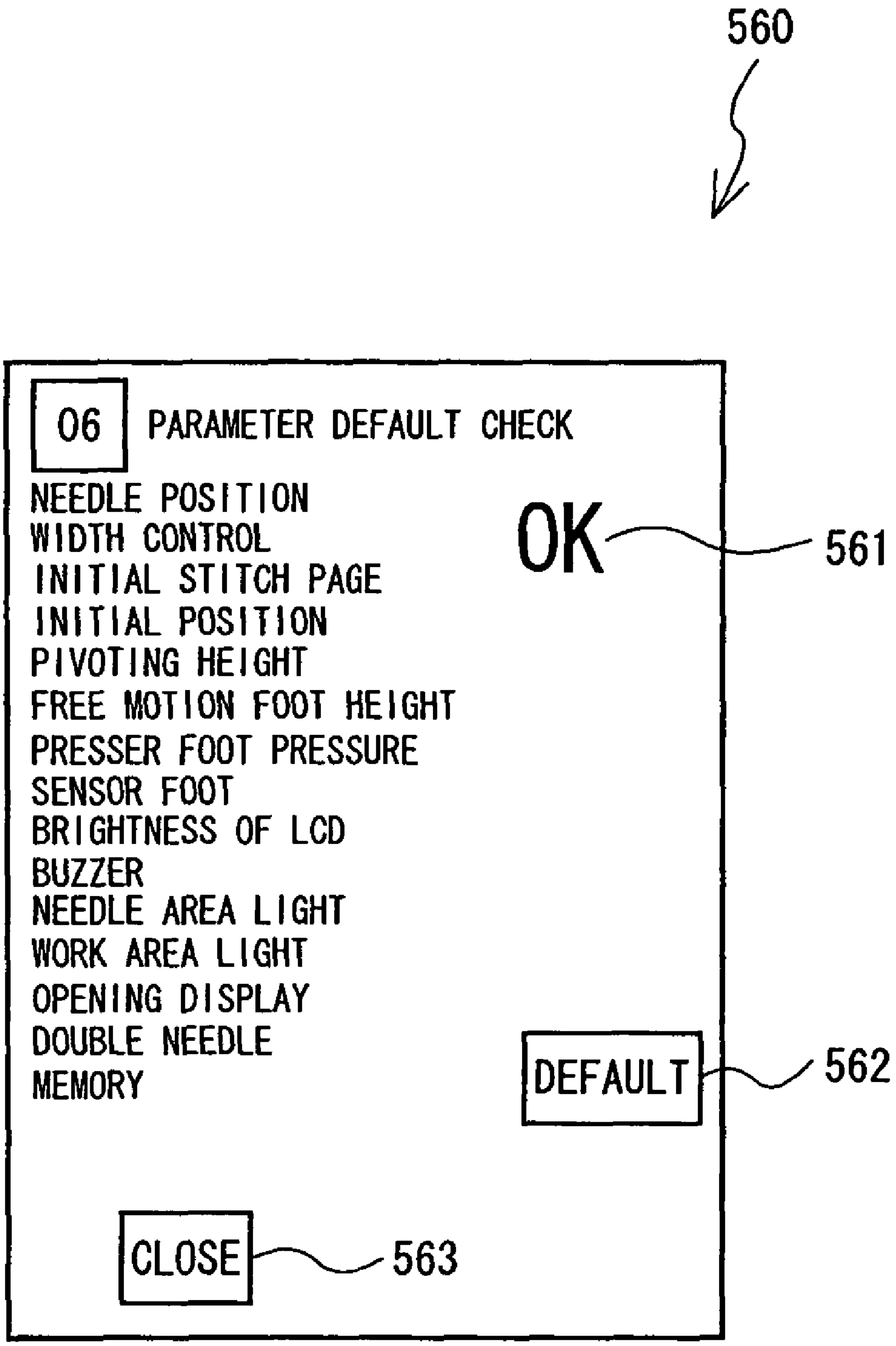
FIG. 14 is an explanatory illustration of a screen which is displayed on the LCD in a case where the test item of parameter defaults is selected.

Subsequently, if "06" is selected by the operator on the selection screen 500 displayed on the LCD 15 shown in FIG. 8, the CPU 61 may display a screen 560 that corresponds to the parameter default confirmation shown in FIG. 14. In this operational test, the operator may confirm whether or not all the parameters stored in the EEPROM 64 have the same values as default values stored in the ROM 62 (S256). As shown in FIG. 7, an acceptance criterion of parameter default confirmation stored in the ROM 62 may be that the parameters indicated on the left part of the screen 560 shown in FIG. 14 must all have the same values as the default values stored in the ROM 62. In the parameter default confirmation, a performance record may be compared with the acceptance criterion. Therefore, when the CPU 61 refers to the EEPROM 64 and the ROM 62 and determines that the parameters displayed on the screen 560 shown in FIG. 14 have the default values, the CPU 61 may determine that the acceptance criterion given in the ROM 62 is satisfied. And a result of the determination 561 may be indicated by the CPU 61 at the upper right position on the screen 560 shown in FIG. 14 and a performance record indicative of already-being-performed may be stored in the parameter check storage region 113 in the EEPROM 64.

On the other hand, if the CPU 61 determines that the acceptance criterion is not satisfied, a result of this determination may be indicated on the screen by the CPU 61 and a parameter whose stored value is different from the default value may be indicated by a reversed character. In a case where it is determined that the acceptance criterion is not satisfied, if a button 562 displayed on the screen 560 is selected by the operator, all the parameters shown in FIG. 14 may be set to the default values and stored in the EEPROM 64. Then, the CPU 61 may determine that all the parameters have the default values and indicate the determination result 561 at the upper right position on the screen 560 shown in FIG. 14. Further, a performance record indicative of being-already-performed may be stored in the parameter check storage region 113 in the EEPROM 64. If a CLOSE button 563 shown in FIG. 14 is selected by the operator subsequently, the display on the LCD 15 may return to the selection screen 500 shown in FIG. 8.

Now, the adjustment confirmation process (S250) shown in FIG. 5 may end. The adjustment confirmation process (S250) may be followed by a confirmation display process (S260) that confirms whether or not all the operational tests have ended properly. In this process, "07" may be selected on the selection screen 500 displayed on the above-described LCD 15 shown in FIG. 7 and a result of determination may be confirmed by the CPU 61 equipped in the sewing machine 1.

The CPU 61 may refer to the contrast adjustment storage region 105, the pivoting height confirmation storage region 108, the maximum rotational speed confirmation storage region 109, the dissipation power confirmation storage region 111, the touch panel adjustment confirmation storage region 112, and the parameter check storage region 113 in the EEPROM 64, and may determine whether or not a performance record indicative of being-already performed is stored for all of the test items. If the CPU 61 determines that the operational test has been performed on all of the test items, it may indicate a screen 610 shown in FIG. 15 on the LCD 15. For example, on the screen 610, characters displayed at the upper left position indicate the test items displayed by the CPU 61. For the operational test that did not end normally, the screen 610 may indicate the test item by reversing its character. The screen 610 indicates that the LCD contrast adjustment 611, pivoting operation confirmation 612, maximum rotational speed confirmation 613, dissipation power confirmation 614, touch panel adjustment confirmation 615, and parameter default confirmation 616, all have ended normally.

Further, the screen 610 may display test items such as an adjustment set value and a measured value that have been stored as a performance record. On the screen 610, an adjustment set value of the LCD contrast adjustment 611 and a measured value of the maximum rotational speed confirmation 613 may be displayed. For example, the screen 610 may display "62" as the adjustment set value of the LCD contrast adjustment 611 and "1010" as the measured value of the maximum rotational speed confirmation 613, respectively. In such a manner, performance records of the operational tests may be collected on the one screen 610, which indicates the results of the determination by the CPU 61, so that it is possible to easily confirm all of the performance records of the operational tests. Further, on the upper right position of the screen 610, as a determination result, "OK" may be displayed, which indicates that the operational test has been normally performed on all of the test items. It thus may be possible to save a labor of referring to the performance record of each of the test items to thereby determine whether or not it has been performed properly. It is further possible to mitigate a labor of confirming whether or not the operational test has been properly performed on all of the test items.

Figure 15:
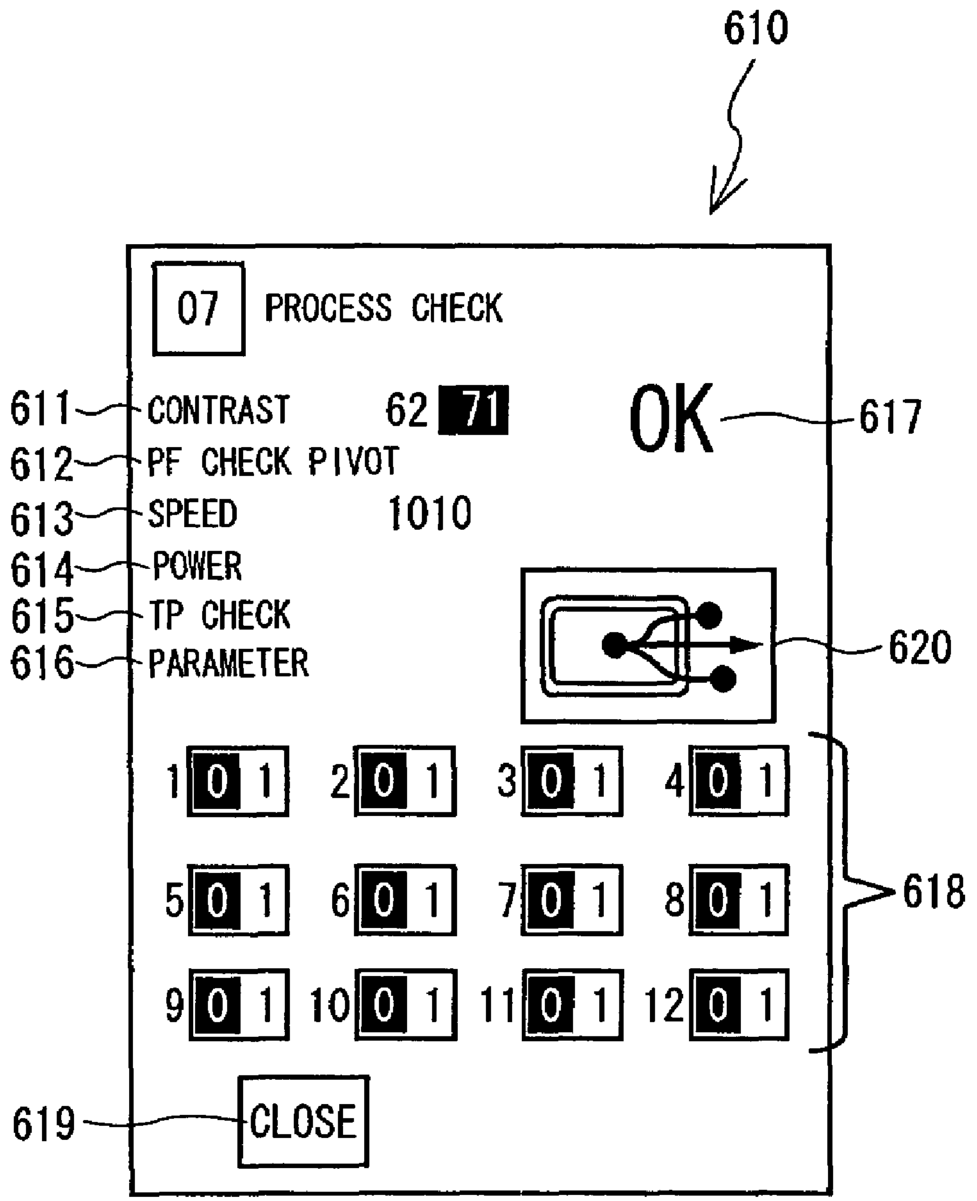
FIG. 15 is an explanatory illustration of a screen of the LCD on which a result (OK) of determination by an overall determination device is displayed.

An output button 620 displayed on the right-of-center position of the screen 610 shown in FIG. 15 may be provided to command outputting performance records of the operational tests stored in the EEPROM 64 together with individual identification information constituted of the serial number of the sewing machine 1. If the output button 620 is pressed by the operator, the performance records may be stored in the EEPROM 64 and the individual identification information may be outputted to the external access RAM 37 so that they can be provided to the outside of the sewing machine 1, for example, to a computer or a data storage medium, such as a memory card and a HDD unit, via the connector 35. Because the sewing machine 1 is equipped with the connector 35, information obtained in the operational test may be fed back and effectively utilized in manufacture management, for example. Further, a display region 618 displayed on the lower part of the screen 610 may be a preliminary storage region capable of storing performance records of and additional operational test when an operational test is added. For example, 12 test items may be newly added as shown in FIG. 15. By providing the preliminary storage region, even when a test item is newly added, performance records of the newly added test item may be stored without adding a new storage region.

Figure 16:
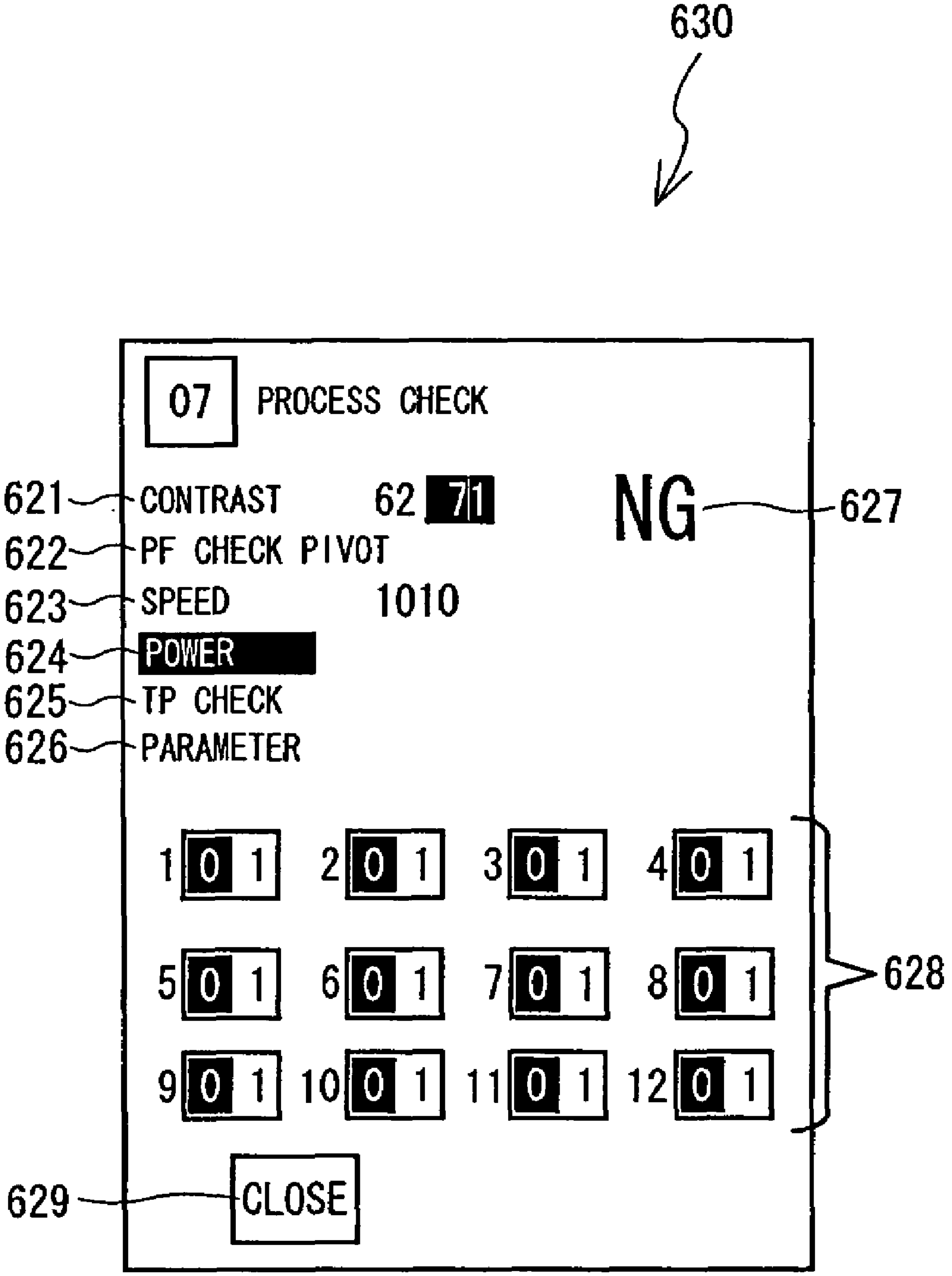
FIG. 16 is an explanatory illustration of a screen of the LCD on which a result (NG) of determination by the overall determination device is displayed.

On the other hand, in a case where the CPU 61 determines that a performance record indicative of being-already-performed is not stored yet in the EEPROM 64 on any of the test items, the CPU 61 may display a screen 630 shown in FIG. 16 on the LCD 15. On the upper right position of the screen 630, "NG" may be displayed that indicates that the operational test has not normally been performed on any of the test items as a result of the determination. The test items not stored as being already performed in the EEPROM 64 may be explicitly indicated by the CPU 61 in characters in a different format from that of characters indicating the other test items. For example, in FIG. 16, if the dissipation power confirmation is not performed yet, characters "POWER" indicating the dissipation power confirmation 624 may be reversed. If the confirmation display process (S260) turns out to be "NG", until the screen 610 shown in FIG. 15 appears, the operator may continue to carry out the operational test on the test items not performed yet and go to the confirmation display process (S260) again. The operational test may not end in a condition where "NG" is displayed as shown on the screen 630, so that a button corresponding to the output button 620 displayed on the screen 610 shown in FIG. 15 is not displayed on the screen 630.

If it is determined in the confirmation display process that the adjustment confirmation process has ended normally, the sewing machine 1 may be subsequently subjected to an inspection process (S270). This process involves a variety of inspections on the sewing machine 1. When the inspection process ends, the entire manufacture process may end.

Now, the manufacture process of the sewing machine 1 in accordance with the exemplary embodiment ends. A record of performance in the manufacture process may be accessed by, for example, operating the sewing machine 1 actuated in the first mode and referring to the above-described screen 610 or 630.

According to the above-described sewing machine manufacture management method, the operational test may be performed on the sewing machine 1 at the adjustment confirmation process (S250), to store a record of performing the operational test in the storage device equipped in the sewing machine. It may be confirmed on the LCD 15 in the confirmation display process (S260) whether or not the operational test has been normally completed on the entire test items. It thus may be possible to properly manage whether or not the operational test has been performed on the sewing machines for each of them. It further may be possible to feed back a performance record obtained in the operational test to the manufacture process, thereby properly managing the manufacture process of the sewing machine. Because the operational test is performed during the manufacture process, the sewing machine 1 that has passed through the manufacture process managed by the present manufacture management method may be referred to in order to know whether or not the operational test has been properly performed on it during the manufacture process. Moreover, for example, if the sewing machine has encountered a trouble or a fault, it may be possible to refer to its records of performance of the operational test during the manufacture process, thereby locating the cause of the trouble or the fault.

Also, the above-described sewing machine 1 may store in the EEPROM 64 a record of performance of the operational test to adjust or confirm the operations of the sewing machine, and may be equipped with the LCD 15 to display the performance record that is stored in the EEPROM 64. Accordingly, the operator may confirm on the LCD 15, the performance records of the operational test carried out during the manufacture process or the repair process, for example, it may be also possible to feed back information obtained in the operational test so that the information may be effectively utilized in manufacture management, for example. The performance record may include information of an adjustment set value, a measured value and whether or not the test has been performed and, therefore, may be confirmed after the operational test is performed. Therefore, it may be possible to easily manage the test item-specific performance record as production information for each of the sewing machines. Further, by referring to the test item-specific performance record, it may be possible to prevent the operational test from being performed redundantly or failing to carry out a specific test item. Further, the sewing machine 1 may be capable of easily selecting a desired one of the test items stored in the ROM 62 by using the touch panel 26.

Further, the CPU 61 may determine whether or not a result of the operational test satisfies the operational test acceptance criterion stored in the ROM 62 and display a result of the determination on the LCD 15. This may save a labor of the operator confirming whether or not the operational test is properly performed for each of the test items. Moreover, the CPU 61 may determine whether or not the entire test items are acceptable and display a result of the determination on the LCD 15. This may save a labor of the operator confirming whether or not the operational test is properly performed on the entire test items. Also, because the LCD 15 is thin, a space for installing may be reduced and a performance record may be displayed clearly. Further, because the LCD 15 displays a performance record for each of the test items, the operator may confirm for each test item an adjustment set value and whether or not the operational test is performed.

Further, the sewing machine 1 may include the sewing start/stop switch 21 that switches between the first mode to perform the operational test or access performance records and the second mode to perform sewing, the reverse stitching switch 22, the thread up-and-down switch 23, and the power supply switch (not shown). Accordingly, the second mode may be usually selected to perform sewing. It thus may be possible to prevent occurrence of the operator of the sewing machine mistakenly actuating the first mode during the operation of the sewing machine. Also, because the sewing machine 1 is equipped with the connector 35, a record of performing the operational test may be outputted together with the serial number, which is individual identification information of the sewing machine. Accordingly, if the sewing machine 1 encounters a trouble or a fault, it may be possible to track the operational tests performed on the sewing machine. It also may be possible to feed back information obtained in the operational test and effectively utilize it in manufacture management etc.

While various features have been described in conjunction with the examples outlined above, various alternatives, modifications, variations, and/or improvements of those features and/or examples may be possible. Accordingly, the examples, as set forth above, are intended to be illustrative. Various changes may be made without departing from the broad spirit and scope of the underlying principles.

For example, arbitrary information obtained in the operational test may also be stored as the performance record. A date of a day on which the operational test has been performed, a performer's name or ID, a place of test performance, an ID of the place, or performance conditions such as the temperature and humidity of the place may also be stored as the performance record. Further, the information on whether or not the operational test has been performed and the determination result may be stored separately from each other or the measured value or adjustment confirmation value may serve also as the information on whether or not the operational test has been performed.

Additionally, the exemplary embodiment is not limited to using the EEPROM 64 and ROM 62. For example, an arbitrary storage device may be employed instead. Further, the performance record storage device may be configured to store only the most recent performance record or provided with a storage region to enable addition of a performance record of a newly performed operational test so that records of the operational test performed a plurality of number of times may be stored separately from each other.

Additionally, the exemplary embodiment is limited to LCD 15 as the display device. For example, a plasma display or any other known or later-developed display device may be employed. Also, contents to be displayed on the display device and a layout of items to be displayed may be changed, for example, with different test items, sizes of display device and characteristics of the display. Further, the exemplary embodiment is not limited to displaying different screens on the LCD 15 for different operational tests. For example, one screen may be configured to accommodate a plurality of operational tests.

The exemplary embodiment is also not limited to using the touch panel 26 to select items. For example, the operator may employ a variety of switches or a track ball, a mouse, a voice input device, or any other known or later-developed interface.

Further, the exemplary embodiment is limited to using the sewing start/stop switch 21, the reverse stitching switch 22, and the needle up-and-down switch 23 as switching devices. For example, any device may be employed as far as it can switch the first and second modes from each other. It may be configured such that the first and second modes may be switched between each other, for example, when the power supply switch is turned ON in a condition and only any one of the sewing start/stop switch 21, the reverse stitching switch 22, and the needle up-and-down switch 23 is held down. Further, it may be configured such that, when a specific one of these switches is held down for a predetermined lapse of time, the first and second modes are switched between each other. Also, a dedicated switch may be provided and used to switch between the first and second modes or the touch panel 26 may be used to select the mode. It should be noted that in order to prevent a switching device from being mistakenly selected during usual sewing work in the second mode, the switching device should preferably be configured to switch between the first and second modes if an unusual operation is performed, as in the case of the exemplary embodiment.

The sewing machine 1 in accordance with the exemplary embodiment may be configured to store a record of performance of an operational test, which is carried out during the manufacture process. However, instead of being stored, the performance record of the operational test carried out during the manufacture process may be configured so as to be recordable. However, in order to refer to which operational test has been performed during the manufacture process after the performance so that information obtained during the operational test can be fed back and effectively utilized in manufacture management, for example, it may be preferable to be configured to store a performance record of the operational test carried out during the manufacture process.

Further, the exemplary embodiment may be carried out an operational test on six test items in the adjustment confirmation process. However, contents of the test items, the number of the test items, and an order in which the operational test is carried out may be changed appropriately and may not be limited to those of the exemplary embodiment.

Additionally, the exemplary embodiment is not limited to a manufacture management method for managing a manufacture process shown in FIG. 5. For example, steps of the manufacture process may be added or deleted, and it also may be possible to change the contents to be carried out during each of the steps and the order in which the steps are carried out.

Additionally, the exemplary embodiment is not limited to the operator performing a variety of confirmation jobs and such operations as to select test items to be displayed on the LCD 15 during the adjustment confirmation process and operating a screen corresponding to each of the test items. For example, some or all of these may be configured to be carried out by the sewing machine 1 automatically or using by a system that manages the adjustment confirmation process.

The exemplary embodiment is also not limited to displaying a record of determination made by the overall determination device in the confirmation display process. For example, it may be possible to display on the display device at least one the status of each the performance of the test items of the operational test, i.e., whether or not the test items have been performed, which can be obtained by referring to the performance records stored in the performance record storage device, and the results of the operational test for each of the test items, i.e., whether or not each of the test items has passed or failed.

A sewing machine of the present disclosure may be equipped with a display device that stores a record of performance of the operational test to adjust or confirm the sewing machine in the performance record storage device and displays the performance records stored in the performance record storage device. It thus may be possible to confirm on the display device the records of performance of the operational test carried out during the manufacture process, the repair process, etc. during or after the operational test. It may be further possible to easily manage as production information the performance records stored in the performance record storage device for each of the sewing machines and so, for example, upon occurrence of a trouble or a fault on the sewing machine, refer to the performance records and feed them back to the manufacture process, etc.

Further, according to the sewing machine manufacture management method of the exemplary embodiment, the operational test may be carried out in the adjustment confirmation process, to store its performance record in the performance record storage device of the sewing machine. Moreover, the performance record storage device may be referred to in order thereby to confirm, on the display device, whether or not the operational test has ended normally on the entire test items. It thus may be possible to properly manage whether or not the operational test has been performed. Further, it may be possible to manage the sewing machine manufacture process appropriately by feeding back to the manufacture process a performance record of the operational test stored in the performance record storage device.

What is claimed is:

1. A sewing machine that forms stitches in a work cloth by relatively moving the work cloth with respect to a vertically moving needle, the sewing machine comprising:

a display device that displays a record of performing an operational test, in which operations of the sewing machine are adjusted or confirmed, the operational test including test items;

a performance record storage device that stores the performance record, the performance record being correlated with the test items of the operational test;

an item storage device that stores the test items;

an item selection device that selects one of the test items stored in the item storage device; and a performance record display control device that causes the display device to display the performance record of the one of the test items, which is selected by the item selection device.

2. The sewing machine according to claim 1, wherein the performance record is set when adjusting the operations of the sewing machine during the operational test, and includes at least an adjustment set value, which is a parameter that is referred to when controlling the operations of the sewing machine.

3. The sewing machine according to claim 1, wherein the performance record includes at least a value measured when confirming the operations of the sewing machine in the operational test.

4. The sewing machine according to claim 1, wherein the performance record includes status of the performance of each of test items of the operational test.

5. The sewing machine according to claim 1, further comprising:

a reference storage device that stores acceptance criteria of the operational test, the acceptance criteria being correlated with each of the test items;

a determination device that makes a pass-or-fail determination on the each of the test items by comparing the performance record or an operation of the operational test to the acceptance criteria stored in the reference storage device; and a determination result display control device that causes the display device to display a result of the determination by the determination device.

6. The sewing machine according to claim 1, further comprising:

a reference storage device that stores acceptance criteria of the operational test, the acceptance criteria are correlated with each of the test items;

a determination device that makes a pass-or-fail determination on the each of the test items by comparing an operation of the performance record or the operational test to the acceptance criteria stored in the reference storage device;

an overall determination device that determines whether or not all of the test items stored in the item storage device have been determined by the determination device as acceptable; and an overall determination result display control device that causes the display device to display a result of the determination by the overall determination device.

7. The sewing machine according to claim 1, wherein the display device is a liquid crystal display.

8. The sewing machine according to claim 1, wherein the display device displays the performance record for each of the test items.

9. The sewing machine according to claim 1, further comprising a mode switching device that switches between a first mode to perform the operational test or display the performance record and a second mode to perform sewing.

10. The sewing machine according to claim 9, wherein the display device displays the performance record when in the first mode; and displays sewing information including at least patterns to be sewn, when in the second mode.

11. The sewing machine according to claim 1, further comprising an output device that outputs the performance record stored in the performance record storage device together with at least individual identification information of the sewing machine.

12. A method for managing manufacture of a sewing machine, the sewing machine forming stitches in a work cloth by relatively moving the work cloth with respect to a vertically moving needle, the method comprising:

displaying a record of performing an operational test, in which operations of the sewing machine are adjusted or confirmed, the operational test including test items;

storing the performance record, the performance record being correlated with the test items of the operational test;

performing the operational test and storing the performance record of the operational test; and displaying at least one of status of the performance for the test items of the operational test and results of each of the test items of the operational test, wherein the status of performance is obtained from the stored performance record, and wherein the results of the each of the test items includes whether the sewing machine has passed the each of the test items, the results being obtained by comparing the performance record and the predetermined acceptance criteria.

13. The method for managing the manufacture of the sewing machine according to claim 12, wherein the performance record is set when adjusting the operations of the sewing machine during the operational test, and includes at least an adjustment set value, which is a parameter that is referred to when controlling the operations of the sewing machine.

14. The method for managing the manufacture of the sewing machine according to claim 12, wherein the performance record includes at least a value measured when confirming the operations of the sewing machine in the operational test.

15. The method for managing the manufacture of the sewing machine according to claim 12, wherein the performance record includes status of the performance of each of the plurality of tests items operational test.

16. The method for managing the manufacture of the sewing machine according to claim 12, further comprising:

storing the test items;

selecting one of test items stored in the storing the test items; and displaying the performance record of the one of the test items, which is selected by the item selection device.

17. The method for managing the manufacture of the sewing machine according to claim 12, further comprising:

storing acceptance criteria of the operational test, the acceptance criteria being correlated with each of the test items;

making a pass-or-fail determination on the each of the test items by comparing the performance record or an operation of the operational test to the acceptance criteria stored in the storing the acceptance criteria; and displaying a result of the making the pass-or-fail determination.

* * * * *